US011343222B2

(12) United States Patent
Erickson et al.

(10) Patent No.: US 11,343,222 B2
(45) Date of Patent: May 24, 2022

(54) EFFICIENT NETWORK STACK FOR WIRELESS APPLICATION PROTOCOLS

(71) Applicant: Google LLC, Mountain View, CA (US)

(72) Inventors: Grant Michael Erickson, Sunnyvale, CA (US); Martin A. Turon, Berkeley, CA (US); Jonathan Wing-Yan Hui, Belmont, CA (US)

(73) Assignee: Google LLC, Mountain View, CA (US)

( * ) Notice: Subject to any disclaimer, the term of this patent is extended or adjusted under 35 U.S.C. 154(b) by 964 days.

(21) Appl. No.: 15/767,115

(22) PCT Filed: Apr. 1, 2016

(86) PCT No.: PCT/US2016/025526
§ 371 (c)(1),
(2) Date: Apr. 9, 2018

(87) PCT Pub. No.: WO2016/161266
PCT Pub. Date: Oct. 6, 2016

(65) Prior Publication Data
US 2019/0075073 A1 Mar. 7, 2019

Related U.S. Application Data

(60) Provisional application No. 62/141,853, filed on Apr. 2, 2015.

(51) Int. Cl.
*G06F 15/16* (2006.01)
*H04L 61/103* (2022.01)
(Continued)

(52) U.S. Cl.
CPC .......... *H04L 61/103* (2013.01); *H04L 61/256* (2013.01); *H04L 61/6059* (2013.01);
(Continued)

(58) Field of Classification Search
CPC . H04L 61/103; H04L 61/256; H04L 61/6059; H04L 61/6081; H04L 61/1511;
(Continued)

(56) References Cited

U.S. PATENT DOCUMENTS 6,088,591 A 7/2000 Trompower et al.
6,138,019 A 10/2000 Trompower et al.
(Continued)

FOREIGN PATENT DOCUMENTS

CN 102892215 1/2013
EP 2441299 4/2012
(Continued)

OTHER PUBLICATIONS

Peng Qiu, Ung Heo and Jaeho Choi, "The web-sensor gateway architecture for Zigbee," 2009 IEEE 13th International Symposium on Consumer Electronics, Kyoto, 2009, pp. 661-664, (Year: 2009).*
(Continued)

*Primary Examiner* — Taylor A Elfervig
(74) *Attorney, Agent, or Firm* — Colby Nipper PLLC

(57) ABSTRACT

In embodiments of efficient network stack for wireless application protocols, a network stack receives an application-layer message in a first wireless application protocol that includes a source address and a destination address, maps the source address to an Internet Protocol version 6 (IPv6) source address, and maps the destination address to an IPv6 source address. The source node transmits the application-layer message to a destination node in a mesh network using a network stack that implements a second wireless application protocol using the IPv6 source address, and maps the destination address to an IPv6 source address.

12 Claims, 15 Drawing Sheets

(51) Int. Cl.
*H04W 4/029* (2018.01)
*H04L 101/659* (2022.01)
*H04L 101/681* (2022.01)
*H04W 4/80* (2018.01)
*H04L 61/256* (2022.01)
*H04W 40/24* (2009.01)
*H04W 80/12* (2009.01)
*H04W 84/18* (2009.01)
*H04L 61/4511* (2022.01)
*H04W 4/06* (2009.01)
*H04L 61/5038* (2022.01)
*H04W 4/02* (2018.01)
*H04W 80/02* (2009.01)

(52) U.S. Cl.
CPC ......... *H04L 61/6081* (2013.01); *H04W 4/029* (2018.02); *H04W 4/80* (2018.02); *H04W 40/24* (2013.01); *H04W 80/12* (2013.01); *H04L 61/1511* (2013.01); *H04L 61/2038* (2013.01); *H04W 4/027* (2013.01); *H04W 4/06* (2013.01); *H04W 80/02* (2013.01); *H04W 84/18* (2013.01)

(58) Field of Classification Search
CPC .... H04L 61/2038; H04W 4/029; H04W 4/80; H04W 40/24; H04W 80/12; H04W 4/027; H04W 4/06; H04W 80/02; H04W 84/18
USPC ....................................................... 709/245
See application file for complete search history.

(56) References Cited

U.S. PATENT DOCUMENTS

| | | |
|---|---|---|
| 6,665,269 B1 | 12/2003 | Schmitz |
| 7,089,298 B2 | 8/2006 | Nyman et al. |
| 7,263,357 B2 | 8/2007 | Lee et al. |
| 7,292,870 B2 | 11/2007 | Heredia et al. |
| 7,302,704 B1 | 11/2007 | Elliott |
| 7,496,078 B2 | 2/2009 | Rahman |
| 7,546,357 B2 | 6/2009 | Manchester et al. |
| 7,701,858 B2 | 4/2010 | Werb et al. |
| 7,715,354 B2 | 5/2010 | Arunan et al. |
| 7,836,155 B2 | 11/2010 | Kang et al. |
| 7,839,856 B2 | 11/2010 | Sinha et al. |
| 7,894,378 B2 | 2/2011 | Lewis et al. |
| 7,907,581 B2 | 3/2011 | Roh et al. |
| 7,917,133 B2 | 3/2011 | Payne et al. |
| 7,961,674 B2 | 6/2011 | Jing et al. |
| 8,000,334 B2 | 8/2011 | Everson et al. |
| 8,023,478 B2 | 9/2011 | Cam-Winget et al. |
| 8,037,305 B2 | 10/2011 | Rahman |
| 8,107,414 B2 | 1/2012 | Wang et al. |
| 8,116,336 B2 | 2/2012 | Jing et al. |
| 8,171,292 B2 | 5/2012 | Brown |
| 8,270,382 B2 | 9/2012 | Cam-Winget et al. |
| 8,325,922 B1 | 12/2012 | Sun et al. |
| 8,370,905 B2 | 2/2013 | Sangubhatla |
| 8,375,207 B2 | 2/2013 | Dangoor et al. |
| 8,392,712 B1 | 3/2013 | Wilson |
| 8,484,299 B2 | 7/2013 | Mizosoe et al. |
| 8,510,560 B1 | 8/2013 | Lambert et al. |
| 8,611,539 B2 | 12/2013 | Sun et al. |
| 8,634,342 B2 | 1/2014 | Rahman |
| 8,660,121 B2 | 2/2014 | McCormack |
| 8,792,645 B2 | 7/2014 | Schmit et al. |
| 8,811,225 B2 | 8/2014 | McCormack et al. |
| 8,812,833 B2 | 8/2014 | Liu et al. |
| 8,818,276 B2 | 8/2014 | Kiukkonen et al. |
| 8,824,445 B1 | 9/2014 | Berenberg et al. |
| 8,843,241 B2 | 9/2014 | Saberi et al. |
| 8,856,883 B2 | 10/2014 | Chou et al. |
| 8,913,746 B2 | 12/2014 | Ware et al. |
| 9,026,656 B2 | 5/2015 | Eruchimovitch et al. |
| 9,038,150 B2 | 5/2015 | Kodama |
| 9,055,441 B2 | 6/2015 | Lee et al. |
| 9,130,837 B2 | 9/2015 | Bjarnason et al. |
| 9,184,983 B2 | 11/2015 | Lee et al. |
| 9,198,204 B2 | 11/2015 | Mathews et al. |
| 9,241,355 B2 | 1/2016 | Schulert |
| 9,247,492 B2 | 1/2016 | Millington et al. |
| 9,276,818 B2 | 3/2016 | Turon et al. |
| 9,288,228 B2 | 3/2016 | Suumaki |
| 9,290,104 B2 | 3/2016 | Gadh et al. |
| 9,331,849 B2 | 5/2016 | Kodama et al. |
| 9,344,438 B2 | 5/2016 | Xiao et al. |
| 9,351,224 B2 | 5/2016 | Zhou et al. |
| 9,351,232 B2 | 5/2016 | Turon et al. |
| 9,363,732 B2 | 6/2016 | Turon et al. |
| 9,398,471 B2 | 7/2016 | Iyer et al. |
| 9,408,059 B2 | 8/2016 | Cardona |
| 9,444,639 B2 | 9/2016 | Jing et al. |
| 9,462,472 B2 | 10/2016 | Liu et al. |
| 9,525,848 B2 | 12/2016 | Sinha et al. |
| 9,538,568 B2 | 1/2017 | Lee et al. |
| 9,577,879 B1 | 2/2017 | Kumar et al. |
| 9,628,502 B2 | 4/2017 | Clark et al. |
| 9,713,181 B2 | 7/2017 | Wang et al. |
| 9,818,105 B2 | 11/2017 | Jung |
| 9,999,090 B2 | 6/2018 | Turon et al. |
| 10,419,928 B2 | 9/2019 | Holleis |
| 10,693,633 B2 | 6/2020 | Kumar et al. |
| 2007/0266143 A1 | 11/2007 | Zeng et al. |
| 2007/0288638 A1 | 12/2007 | Vuong et al. |
| 2008/0031283 A1 | 2/2008 | Curran-Gray et al. |
| 2008/0056261 A1* | 3/2008 | Osborn ............... H04L 61/6081 370/392 |
| 2008/0304485 A1 | 12/2008 | Sinha et al. |
| 2009/0054033 A1 | 2/2009 | Pratt, Jr. et al. |
| 2010/0205273 A1 | 8/2010 | Shim |
| 2011/0026513 A1 | 2/2011 | Tien |
| 2011/0264915 A1 | 10/2011 | Cam-Winget et al. |
| 2012/0113807 A1 | 5/2012 | Vasseur et al. |
| 2012/0170447 A1 | 7/2012 | Bell et al. |
| 2012/0209808 A1 | 8/2012 | Tien et al. |
| 2013/0104197 A1 | 4/2013 | Nandakumar |
| 2013/0170363 A1 | 7/2013 | Millington et al. |
| 2013/0191755 A1 | 7/2013 | Balog et al. |
| 2013/0288601 A1 | 10/2013 | Chhabra |
| 2014/0044016 A1 | 2/2014 | Rahman |
| 2014/0143855 A1 | 5/2014 | Keoh et al. |
| 2014/0229735 A1 | 8/2014 | Holleis |
| 2014/0376530 A1 | 12/2014 | Erickson et al. |
| 2015/0010000 A1 | 1/2015 | Zhang et al. |
| 2015/0092530 A1 | 4/2015 | Kelsey et al. |
| 2015/0092535 A1 | 4/2015 | Kelsey |
| 2015/0244840 A1* | 8/2015 | Chakrabarti ............ H04L 69/08 370/328 |
| 2015/0372875 A1 | 12/2015 | Turon et al. |
| 2015/0372876 A1 | 12/2015 | Turon et al. |
| 2015/0373750 A1 | 12/2015 | Turon et al. |
| 2016/0029290 A1 | 1/2016 | Turon et al. |
| 2016/0095143 A1 | 3/2016 | Vyas et al. |
| 2018/0242379 A1 | 8/2018 | Turon et al. |

FOREIGN PATENT DOCUMENTS

| | | |
|---|---|---|
| EP | 2661112 | 11/2013 |
| EP | 2897442 | 7/2015 |
| JP | 2008011448 | 1/2008 |
| JP | 2014022808 | 2/2014 |
| WO | 2014037779 | 3/2014 |
| WO | 2014040481 | 3/2014 |
| WO | 2014185839 | 11/2014 |

OTHER PUBLICATIONS

Lee, Woo Suk & Hong, Seung. (2008). KNX—ZigBee gateway for home automation. 750-755. 10.1109/COASE.2008.4626433. (Year: 2008).*

H. Li, Z. Jia and X. Xue, "Application and Analysis of ZigBee Security Services Specification," 2010 Second International Con-

(56) References Cited

OTHER PUBLICATIONS ference on Networks Security, Wireless Communications and Trusted Computing, Wuhan, Hubei, 2010, pp. 494-497 (Year: 2010).*
H. Schulzrinne and E. Wedlund, "Application-layer mobility using SIP," IEEE Globecom '00 Workshop. 2000 IEEE Service Portability and Virtual Customer Environments (IEEE Cat. No.00EX498), San Francisco, CA, USA, 2000, pp. 29-36 (Year: 2000).*
Woo Suk Lee and Seung Ho Hong, "KNX—ZigBee gateway for home automation," 2008 IEEE International Conference on Automation Science and Engineering, 2008, pp. 750-755 (Year: 2008).*
Peng Qiu, Ung Heo and Jaeho Choi, "The web-sensor gateway architecture for Zigbee," 2009 IEEE 13th International Symposium on Consumer Electronics, 2009, pp. 661-664, (Year: 2009).*
Henning Schulzrinne and Elin Wedlund. 2000. Application-layer mobility using SIP. SIGMOBILE Mob. Comput. Commun. Rev. 4, 3 (Jul. 2000), 47-57 (Year: 2000).*
H. Li, Z. Jia and X. Xue, "Application and Analysis of ZigBee Security Services Specification," 2010 Second International Conference on Networks Security, Wireless Communications and Trusted Computing, 2010, pp. 494-497 (Year: 2010).*
Z. Shunyang, X. Du, J. Yongping and W. Riming, "Realization of Home Remote Control Network Based on ZigBee," 2007 8th International Conference on Electronic Measurement and Instruments, 2007, pp. 4-344-4-348 (Year: 2007).*
S. H. Kim, J. S. Kang, H. S. Park, D. Kim and Y. Kim, "UPnP-ZigBee internetworking architecture mirroring a multi-hop ZigBee network topology," in IEEE Transactions on Consumer Electronics, vol. 55, No. 3, pp. 1286-1294, Aug. 2009 (Year: 2009).*
R. Kawamoto, T. Emori, S. Sakata, K. Furuhata, K. Yuasa and S. Hara, "DLNA-ZigBee Gateway Architecture and Energy Efficient Sensor Control for Home Networks," 2007 16th IST Mobile and Wireless Communications Summit, 2007, pp. 1-5 (Year: 2007).*
H. Y. Tung, K. F. Tsang, K. L. Lam and H. C. Tung, "A zero configured HomeCare gateway using ZigBee," 2011 IEEE International Conference on Consumer Electronics (ICCE), 2011, pp. 613-614 (Year: 2011).*
K. Nanda, K. Nayak, S. Chippalkatti, R. Rao, D. Selvakumar and H. Pasupuleti, "Web based monitoring and control of WSN using WINGZ (Wireless IP network gateway for Zigbee)," 2012 Sixth International Conference on Sensing Technology (ICST), 2012, pp. 666-671, (Year: 2012).*
Peng Qiu, Yi Zhao, Ung Heo, Di Zhang and Jaeho Choi, "Gateway architecture for zigbee sensor network for remote control over IP network," 8th Asia-Pacific Symposium on Information and Telecommunication Technologies, 2010, pp. 1-4. (Year: 2010).*
S. H. Hong, "Development of a BACnet-ZigBee gateway for demand response in buildings," 2013 Pan African International Conference on Information Science, Computing and Telecommunications (PACT), 2013, pp. 19-23 (Year: 2013).*
Seok Cheol Park, W. S. Lee, Se Hwan Kim, S. H. Hong and P. Palensky, "Implementation of a BACnet-ZigBee gateway," 2010 8th IEEE International Conference on Industrial Informatics, 2010, pp. 40-45, (Year: 2010).*
"International Search Report and Written Opinion", Application No. PCT/US2016/025526, dated Oct. 27, 2016 00:00:00.0, 20 pages.
"Thread Group Confidential Contents Introduction to Thread", threadgroup.org/portals/0/documents/events/ThreadIntro.pdf, Sep. 30, 2014, 54 pages.
"ZigBee IP Specification", Retrieved at: http://www.zigbee.org/non-menu-pages/zigbee-ip-download/, 85 pages.
Huang, et al., "Dual-Stack Hosts Using "Bump-in-the-Host"", 25 pages.
Wang, et al., "Internetworking Between ZigBee/802.15.4 and IPv6/802.3 Network", Aug. 31, 2016, 6 pages.
"Extended European Search Report", European Application No. 18208360.0, dated Dec. 19, 2018, 12 pages.
"Thread Group Confidential", http://threadgroup.org/Portals/0/documents/events/ThreadIntro.pdf, Sep. 30, 2014, 54 pages.
"ZigBee IP Specification", ZigBee Document 095023r34, Mar. 2014, 86 pages.

Wang, et al., "Internetworking Between ZigBee/802.15.4 and IPv6/802.3 Network", IEEE, Aug. 1, 2007, Aug. 1, 2007, 6 pages.
Yuan, et al., "ECIS, an Energy Conservation and Interconnection Scheme Between WSN and Internet Based on the SLoWPAN", 2013 16th International Conference on Network-Based Information Systems, Sep. 4, 2013, 6 pages.
"Advisory Action", U.S. Appl. No. 14/873,331, dated Sep. 1, 2017, 4 pages.
"Ex Parte Quayle Action", U.S. Appl. No. 14/752,443, dated Sep. 21, 2015, 5 pages.
"Final Office Action", U.S. Appl. No. 15/959,122, 13 Pages.
"Final Office Action", U.S. Appl. No. 14/873,331, dated Oct. 26, 2016, 12 pages.
"Final Office Action", U.S. Appl. No. 14/873,331, dated May 8, 2017, 14 pages.
"First Action Interview Office Action", U.S. Appl. No. 15/959,122, dated Dec. 17, 2019, 12 Pages.
"Foreign Notice of Allowance", CN Application No. 201580014720.6, dated Aug. 31, 2017, 4 pages.
"Foreign Office Action", Japanese Application No. 2019067206, dated Apr. 14, 2020, 3 pages.
"International Search Report and Written Opinion", Application No. PCT/US2015/037549, dated Dec. 1, 2015, 24 pages.
"Non-Final Office Action", U.S. Appl. No. 15/959,122, dated Aug. 24, 2020, 12 Pages.
"Non-Final Office Action", U.S. Appl. No. 14/873,331, dated Nov. 30, 2017, 14 pages.
"Non-Final Office Action", U.S. Appl. No. 14/752,182, dated Oct. 16, 2015, 13 pages.
"Non-Final Office Action", U.S. Appl. No. 14/749,616, dated Oct. 26, 2015, 10 pages.
"Non-Final Office Action", U.S. Appl. No. 14/873,331, dated Jul. 29, 2016, 10 pages.
"Non-Final Office Action", U.S. Appl. No. 14/873,331, dated Jan. 19, 2017, 13 pages.
"Notice of Allowance", U.S. Appl. No. 14/752,443, dated Dec. 15, 2015, 8 pages.
"Notice of Allowance", U.S. Appl. No. 14/752,182, dated Feb. 16, 2016, 7 pages.
"Notice of Allowance", U.S. Appl. No. 14/749,616, dated Feb. 18, 2016, 4 pages.
"Notice of Allowance", U.S. Appl. No. 14/873,331, dated Apr. 18, 2018, 8 pages.
"Pre-Interview Communication", U.S. Appl. No. 15/959,122, dated Nov. 19, 2019, 12 Pages.
"Thread—An Introduction", ThreadIntro, Thread Group, Inc. 20, Sep. 30, 2014, 16 pages.
Kumar, et al., "DTLS Relay for Constrained Environments", DICE Working Group Internet-Draft—draft-kumar-dice-dtis-relay-00, Oct. 21, 2013, 11 pages.
"Extended European Search Report", EP Application No. 20205257.7, dated Jan. 28, 2021, 10 pages.
"Foreign Notice of Allowance", KR Application No. 10-2021-7013550, dated Jul. 28, 2021, 3 pages.
"Foreign Office Action", EP Application No. 20182338.2, dated Jul. 19, 2021, 2 pages.
"Foreign Office Action", AU Application No. 2020289744, dated Jul. 27, 2021, 5 pages.
"Extended European Search Report", European Application No. 20182338.2, dated Oct. 20, 2020, 6 pages.
"Final Office Action", U.S. Appl. No. 15/959,122, dated Nov. 13, 2020, 13 pages.
"Foreign Office Action", AU Application No. 2019275648, dated Aug. 31, 2020, 5 pages.
"Foreign Office Action", AU Application No. 2020260392, dated Nov. 6, 2020, 3 pages.
"Extended European Search Report", EP Application No. 21207846.3, dated Feb. 8, 2022, 9 pages.
"Foreign Office Action", JP Application No. 2020-147536, dated Nov. 9, 2021, 4 pages.
"Understanding Zigbee Commisioning", Retrieved at: http://www.daintree.net/downloads/whitepapers/understanding_zigbee_commissioning.pdf—om Apr. 7, 2011, 13 pages.

(56) References Cited

OTHER PUBLICATIONS

"Foreign Office Action", JP Application No. 2020-147536, dated Mar. 15, 2022, 6 pages.

* cited by examiner

600

| ZigBee Application Layer 504 |
| DTLS 414 |
| UDP 412 |
| Routing Protocol 410 |
| IPv6 408 |
| 6LoWPAN 406 |
| IEEE 802.15.4 MAC 404 |
| IEEE 802.15.4 PHY 402 |

EFFICIENT NETWORK STACK FOR WIRELESS APPLICATION PROTOCOLS

CROSS REFERENCE TO RELATED APPLICATION

This application is a 371 of PCT International Application No. PCT/US2016/025526 filed Apr. 1, 2016 which in turn claims priority under 35 U.S.C. § 119(e) to U.S. Provisional Patent Application Ser. No. 62/141,853 filed Apr. 2, 2015, the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. There are legacy wireless application protocols that have large deployments of devices, as well as newer wireless application protocols that offer enhanced features and better connectivity for distributed applications. However, the evolution and proliferation of various wireless application protocols has led to incompatibilities in home automation networks, even though the various wireless application protocols use networking stacks that are similar in function. In many cases various wireless application protocols use the same standardized technologies at various layers of their network stacks, but are not compatible or interoperable.

SUMMARY

This summary is provided to introduce simplified concepts of efficient network stack for wireless application protocols. The simplified concepts are further described below in the Detailed Description. This summary is not intended to identify essential features of the claimed subject matter, nor is it intended for use in determining the scope of the claimed subject matter.

Efficient network stack for wireless application protocols, generally related to communicating application-level messages using a network stack, in a mesh network, is described. In embodiments, a network stack of a source node can receive an application-layer message that includes a source address and a destination address, map the source address to an Internet Protocol version 6 (IPv6) source address, and map the destination address to an IPv6 source address. The source node transmits the application-layer message to a destination node in the mesh network using the IPv6 source address and the IPv6 address, and using the network stack. The network stack includes a transport layer configured to transport the application-layer message using User Datagram Protocol (UDP), a network layer configured to communicate the application-layer message using IPv6, a data link layer configured to encode the application-layer message for transmission, the data link layer including a 6LoWPAN adaptation layer and a Media Access Control (MAC) layer, and a physical layer configured to transmit the encoded application-layer message with a wireless transceiver in the mesh network.

Efficient network stack for wireless application protocols, generally related to communicating application-level messages using a network stack, in a mesh network, is described. In embodiments, a dual-stack router can receive an application-layer message, which includes a source address and a destination address, using a first network stack that implements a first network protocol, map the source address to an Internet Protocol version 6 (IPv6) source address, and map the destination address to an IPv6 source address. The dual-stack router transmits the application-layer message to a destination node using a second network stack that implements a second network protocol, and using the IPv6 source address and the IPv6 destination address. The second network stack includes a transport layer configured to transport the application-layer message using User Datagram Protocol (UDP), a network layer configured to communicate the application-layer message using IPv6, a data link layer configured to encode the application-layer message for transmission, the data link layer including a 6LoWPAN adaptation layer and a Media Access Control (MAC) layer, and a physical layer configured to transmit the encoded application-layer message via the mesh network.

Efficient network stack for wireless application protocols, generally related to service discovery across multiple mesh networks, is described. In embodiments, a computing device can establish communication with multiple mesh networks over a communication network and transmit a discovery message for a service to the multiple mesh networks, which causes the discovery message to propagate to nodes in the multiple mesh networks. The computing device can receive a response message from each node in the multiple mesh networks that supports the service, the response message indicating that the service is supported and an address of the node that supports the service.

Efficient network stack for wireless application protocols, generally related to translating application-level messages using a cloud-based translation service, is described. In embodiments, a gateway receives an application-layer message, which includes a source address and a destination address, via a mesh network interface. The gateway forwards the received application-layer message over an external network to a translation service where the translation service maps the source address to an Internet Protocol Version 6 (IPv6) source address and maps the destination address to an IPv6 destination address. The gateway receives a translated application-layer message from the translation service, which includes the IPv6 source address and the IPv6 destination address and transmits the translated application-layer message over the mesh network interface using a network stack. The network stack includes a transport layer configured to transport the application-layer message using User Datagram Protocol (UDP), a network layer configured to communicate the application-layer message using IPv6, a data link layer configured to encode the application-layer message for transmission, the data link layer including a 6LoWPAN adaptation layer and a Media Access Control (MAC) layer, and a physical layer configured to transmit the encoded application-layer message via the mesh network.

BRIEF DESCRIPTION OF THE DRAWINGS

Embodiments of efficient network stack for wireless application protocols are described with reference to the following drawings. The same numbers are used throughout the drawings to reference like features and components:

FIG. 6 illustrates an example embodiment of the efficient network stack for wireless application protocols with ZigBee as the application protocol in accordance with embodiments of efficient network stack for wireless application protocols.

DETAILED DESCRIPTION

Figure 1:
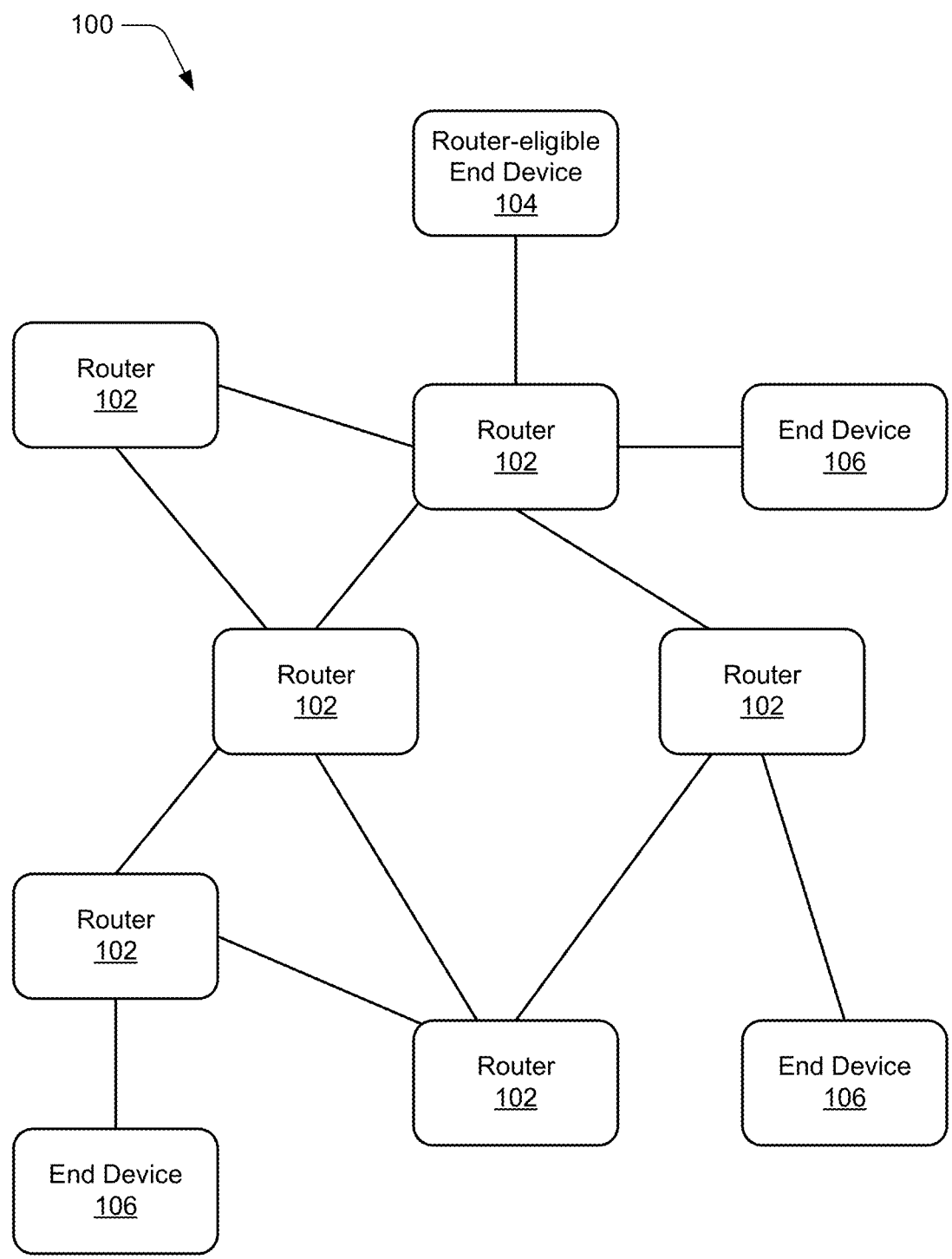
FIG. 1 illustrates an example mesh network system in which various embodiments of the efficient network stack for wireless application protocols can be implemented.

A number of application protocols exist for wireless communication among devices in a home environment. However, the evolution and proliferation of various wireless application protocols has led to incompatibilities in home automation networks. For example, a homeowner installs a lighting control network that uses a first application protocol and later decides to automate HVAC controls. The first application protocol may only support lighting control, leading the homeowner to install a system using a second application protocol for the HVAC control. The two different application protocols may have many similar features, may share a common radio spectrum, and may even have similar network stacks, but the two application protocols operate as separate, incompatible networks that the user must individually maintain and operate.

To effectively and efficiently communicate data between devices within the home environment, multiple wireless application protocols are adapted to communicate using a common, efficient network stack, such as the Thread® network stack. The efficient network stack is described in U.S. patent application Ser. No. 13/926,312 entitled "Efficient Network Layer For IPv6 Protocol" filed Jun. 25, 2013, the disclosure of which is incorporated by reference herein in its entirety. A fabric network, using the efficient network stack, may enable numerous devices within a home to communicate with each other using one or more logical networks. The fabric network is described in U.S. patent application Ser. No. 13/926,335 entitled "Efficient Communication For Devices Of A Home Network" filed Jun. 25, 2013, the disclosure of which is incorporated by reference herein in its entirety.

The efficient network stack provides reliable, cost-effective, low power, wireless, device-to-device communication using IP-based, mesh networking. By running the multiple application protocols over the efficient network stack, the multiple application protocols utilize common transport and networking protocols for network operation, routing, security, and reliability, as described in detail below.

The efficient network stack establishes a communication network in which numerous devices within a home may communicate with each other via a wireless mesh network. The communication network supports Internet Protocol version 6 (IPv6) communication such that each connected device has a unique Internet Protocol (IP) address. Moreover, to enable each device to integrate with a home, it may be useful for each device to communicate within the network using low amounts of power. By enabling devices to communicate using low power, the devices may be battery-powered and placed anywhere in a home without being coupled to a continuous power source.

The efficient network stack establishes a procedure in which data is transferred between two or more devices such that the establishment of the communication network involves little user input, the communication between devices involves little energy, and the communication network, itself, is secure. In one embodiment, the efficient network stack is an IPv6-based communication network that employs Routing Information Protocol-Next Generation (RIPng) as its routing mechanism and a Datagram Transport Layer Security (DTLS) protocol as its security mechanism. As such, the efficient network stack provides a simple means for adding or removing devices to a home while protecting the information communicated between the connected devices. The adding of devices to a mesh network in a home includes commissioning devices to join the mesh network and optionally provisioning the devices to update and/or configure the device to operate as part of an application or service. The commissioning of mesh network devices is described in U.S. patent application Ser. No. 14/749,616 entitled "Mesh Network Commissioning" filed Jun. 24, 2015, the disclosure of which is incorporated by reference herein in its entirety.

While features and concepts of the described systems and methods for the efficient network stack for wireless application protocols can be implemented in any number of different environments, systems, devices, and/or various configurations, embodiments of the efficient network stack for wireless application protocols are described in the context of the following example devices, systems, and configurations.

FIG. 1 illustrates an example mesh network system 100 in which various embodiments of the efficient network stack for wireless application protocols can be implemented. The mesh network 100 (i.e., the fabric network) is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the mesh network interface. The routers 102 also route traffic across the mesh network 100. The routers 102 and the router-eligible end devices 104 can assume various roles, and combinations of roles, within the mesh network 100, as discussed below.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional devices. The end devices 106 are devices that can communicate using the mesh network 100, but lack the capability, beyond simply forwarding to its parent router 102, to route traffic in the mesh network 100. For example, a battery-powered sensor is one type of end device 106.

The routers 102, the router-eligible end device 104, and the end devices 106 include network credentials that are used to authenticate the identity of these devices as being a member of the mesh network 100. The routers 102, the router-eligible end device 104, and the end devices 106 also use the network credentials to encrypt communications in the mesh network.

Figure 2:
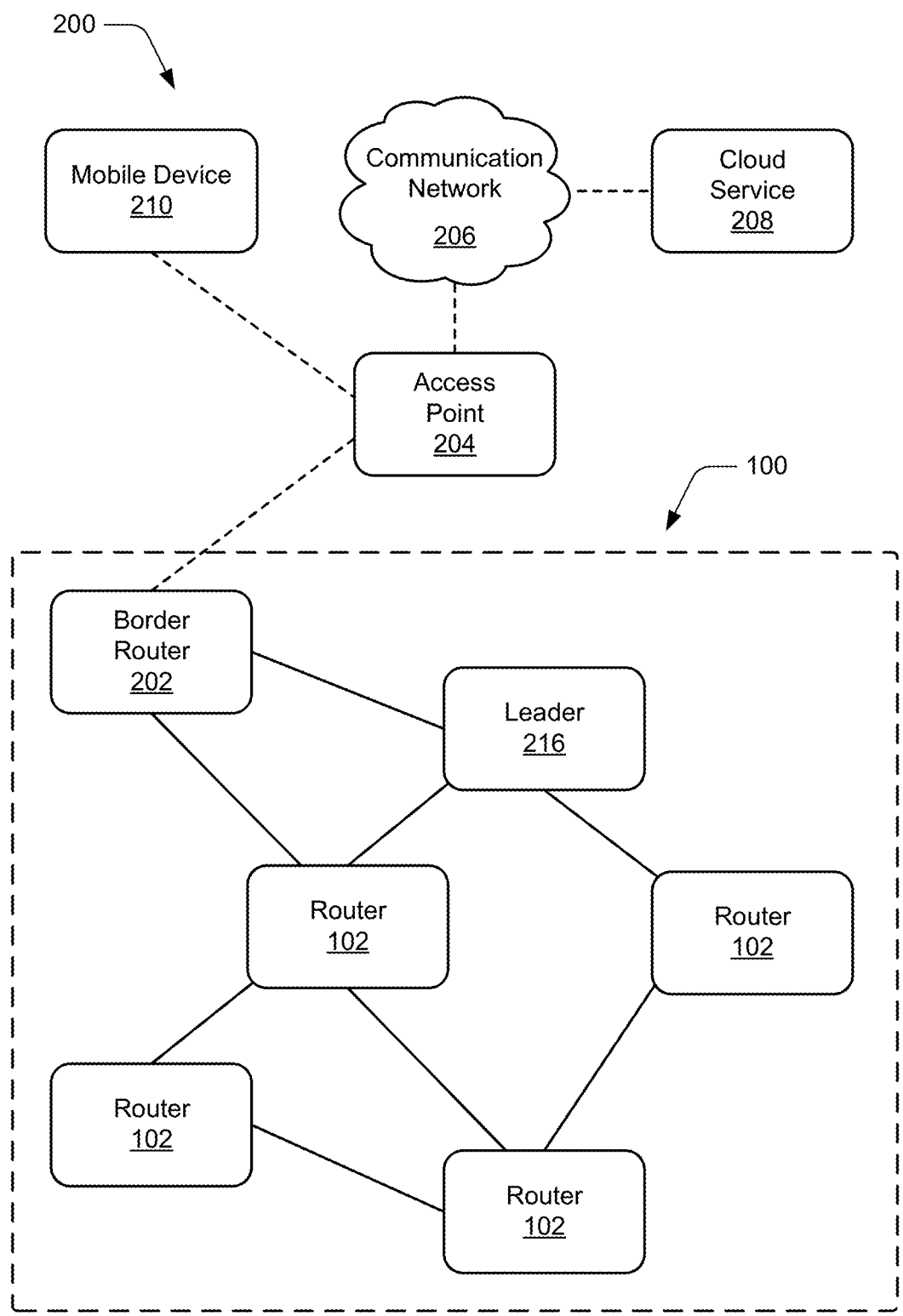
FIG. 2 illustrates an example environment in which various embodiments of the efficient network stack for wireless application protocols can be implemented.

FIG. 2 illustrates an example environment 200 in which various embodiments of the efficient network stack for wireless application protocols can be implemented. The environment 200 includes the mesh network 100, in which some routers 102 are performing specific roles in the mesh network 100. The devices within the mesh network 100, as illustrated by the dashed line, are communicating securely over the mesh network 100, using the network credentials. Devices shown outside the mesh network 100 do not have a copy of the network credentials for the mesh network 100 and cannot use mesh network layer security to securely communicate.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, or any other suitable device for bridging different types of networks. The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

A user choosing to control devices in the mesh network 100 can use a mobile device 210, which connects to the border router 202 via the external network technology of the access point 204, to commission the new device. The mobile device 210 may be any computing device, such as a smart phone, tablet, notebook computer, and so forth, with a suitable user interface and communication capabilities to execute applications that control devices to the mesh network 100.

One of the routers 102 performs the role of a leader 216 for the mesh network 100. The leader 216 manages router identifier assignment and the leader 216 is the central arbiter of network configuration information for the mesh network 100. The leader 216 also controls which commissioning device is accepted as a sole, active commissioner for the mesh network 100, at any given time.

The Efficient Network Stack

Figures 3, 4:
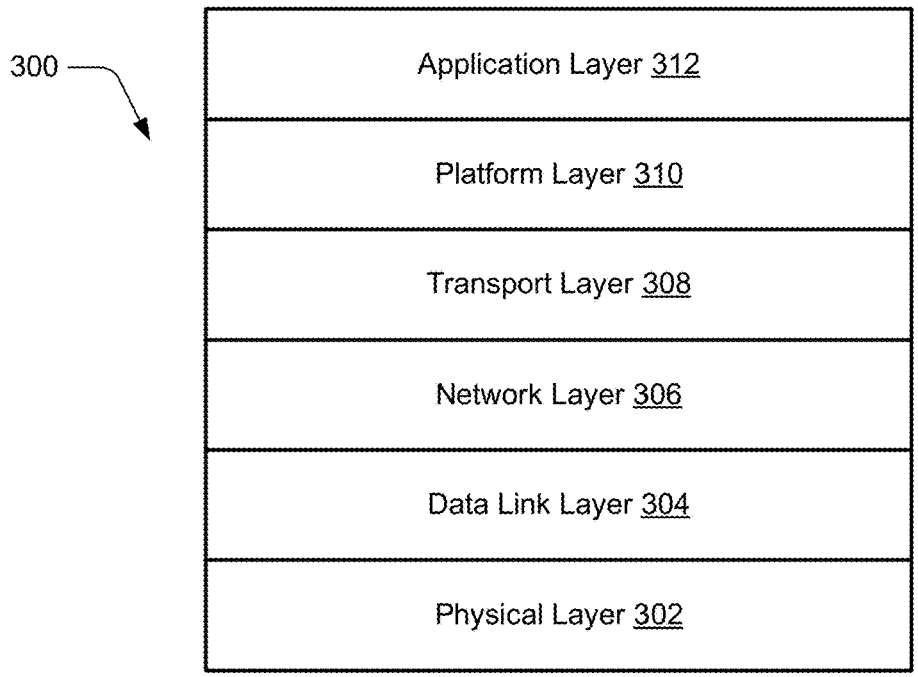
FIG. 3 illustrates an Open Systems Interconnection (OSI) model that in which various embodiments of the efficient network stack for wireless application protocols techniques can be implemented.
FIG. 4 illustrates an example of protocols used in a mesh network environment in accordance with embodiments of the efficient network stack for wireless application protocols.

FIG. 3 illustrates an example block diagram of an Open Systems Interconnection (OSI) model 300 that characterizes a communication system for the example environments 100, 200 in which various embodiments of the efficient network stack for wireless application protocols techniques can be implemented. Generally, the efficient network stack may be part of the Open Systems Interconnection (OSI) model 300. The OSI model 300 illustrates functions of a communication system with respect to abstraction layers, in that the OSI model may specify a networking framework or how communications between devices may be implemented. In one embodiment, the OSI model includes six layers: a physical layer 302, a data link layer 304, a network layer 306, a transport layer 308, a platform layer 310, and an application layer 312. Generally, each layer in the OSI model 300 serves the layer above it and is served by the layer below it. In at least some embodiments, a higher layer is agnostic to technologies used in lower layers. For example the platform layer 310 is agnostic to the network type used in the network layer 306.

The physical layer 302 provides hardware specifications for devices that communicate with each other. As such, the physical layer 302 establishes how devices connect to each other, assists in managing how communication resources are shared between devices, and the like.

The data link layer 304 specifies how data is transferred between devices. Generally, the data link layer 304 provides a way in which data packets being transmitted are encoded and decoded into bits as part of a transmission protocol.

The network layer 306 specifies how the data being transferred to a destination node is routed. The network layer 306 also provides a security protocol that maintains the integrity of the data being transferred.

The transport layer 308 specifies a transparent transfer of the data from a source node to a destination node. The transport layer 308 also controls how the transparent transfer of the data remains reliable. As such, the transport layer 308 is used to verify that data packets intended to transfer to the destination node indeed reached the destination node. Example protocols that may be employed in the transport layer 308 include Transmission Control Protocol (TCP) and User Datagram Protocol (UDP).

The platform layer 310 (also known as an application sublayer, an application interface layer, and/or an application framework) establishes connections between devices according to the protocol specified within the transport layer 308. The platform layer 310 also translates the data packets into a form that the application layer 312 may use. The application layer 312 supports a software application that may directly interface with the user. As such, the application layer 312 implements protocols defined by the software application. For example, the software application may provide services such as file transfers, electronic mail, and the like.

FIG. 4 illustrates an example of protocols used in an embodiment of an efficient network stack 400 as part of the OSI stack 300 shown and described with reference to FIG. 3. In an embodiment, the physical layer 302 of the efficient network stack 400 includes an IEEE 802.15.4 Physical (PHY) layer 402 to transmit and receive mesh network communications in the mesh network 100.

In an embodiment, the data link layer 304 of the efficient network stack 400 includes an IEEE 802.15.4 Media Access Control (MAC) layer 404 to specify how data is transferred between devices, including MAC security, and a 6LoWPAN adaptation layer 406 to adapt IPv6 addresses to IEEE 802.15.4 addressing. In an embodiment, the network layer 306 of the efficient network stack 400 uses IPv6, at 408, and a routing protocol 410, such as Distance Vector Routing, to specify how the data being transferred to a destination node is routed.

In an embodiment, the transport layer 308 of the efficient network stack 400 uses User Datagram Protocol (UDP), at 412, to specify a transparent transfer of the data from a source node to the destination node. The transport layer 308 uses a Datagram Transport Layer Security (DTLS) protocol 414 as its security mechanism for the data transfer from the source node to the destination node. Alternatively, the transport layer 308 can use Transport Control Protocol (TCP) and Transport Layer Security (TLS) for the data transfer from the source node to the destination node.

Application Protocols Using the Efficient Network Stack

A number of wireless network standards define application protocols and frameworks for device to device communication, such as ZigBee®, Dust Networks®, Z-Wave®, Open Interconnect Consortium (OIC), IoTivity, AllJoyn™, ISA100, WirelessHART, and so forth. These wireless standards are typically defined in terms of a layered model that specifies services and/or technologies that provide the functions described with respect to the OSI model 300, above.

The various application protocols and frameworks may specify portions of their respective layered models by selecting standardized technologies. For example, ZigBee specifies IEEE 802.15.4 for its physical and data link layers, AllJoyn specifies TCP/UDP and IP for its transport and network layers, and OIC specifies DTLS/UDP and IPv6 for its transport and network layers. As a result, the various application protocols and frameworks utilize networking protocols that are similar, or identical, to the networking protocols included in the efficient network stack 400. The various application protocols and frameworks encode and interpret application-level messages in varying manners at the application layer 312, but the various application protocols and frameworks rely on similar or identical services from the transport layer 308 through the physical layer 302. Thus, the upper layers of the various application protocols and frameworks can be adapted to use the transport layer 308 through the physical layer 302 of the efficient network stack 400.

An addressing scheme specific to any application layer protocol is mapped to IPv6 addressing for the source and destination addresses of the application-level messages and the application-level messages are transported between source and destination nodes using the efficient network stack 400. IPv6 addressing expands the logical and physical span of the network running the application protocol, as described in detail below. For example, the mapping of addresses to IPv6 may be done by the efficient network stack 400, by a layer, sub-layer, or a shim layer inserted between the application layer and the efficient network stack 400, or by a layer, sub-layer, or a shim layer inserted into the efficient network stack 400.

A formatting scheme specific to any application layer protocol, such as the fixed, binary formatting in the ZigBee Cluster Library (ZCL), may be serialized (or marshalled) for transmission. For example, application layer messages are serialized using Concise Binary Object Representation (CBOR), Protocol Buffers, or any other suitable serialization format. For example, the serialization may be done by the efficient network stack 400, by a layer, sub-layer, or a shim layer inserted between the application layer and the efficient network stack 400, or by a layer, sub-layer, or a shim layer inserted into the efficient network stack 400.

The following sections provide an overview of ZigBee, a detailed example, using ZigBee, of the application layer 312 of a wireless application protocol operating over the efficient network stack 400, and examples of the adaptation of other wireless application protocols over the efficient network stack 400. Although aspects of the efficient network stack 400 are described in examples of specific wireless application protocols and/or application profiles, the concepts apply equally to any wireless application protocol and/or application profile.

ZigBee is a specification for a suite of communication protocols used to create personal area networks built using low-power radios. Though its low power radios limit transmission distances, ZigBee devices can transmit data over long distances by passing data through a mesh network of intermediate devices to reach more distant ones. ZigBee is typically used in low data-rate applications that require long battery life and secure networking. Applications include wireless light switches, home automation, smart energy, and other consumer and industrial applications.

Figure 5:
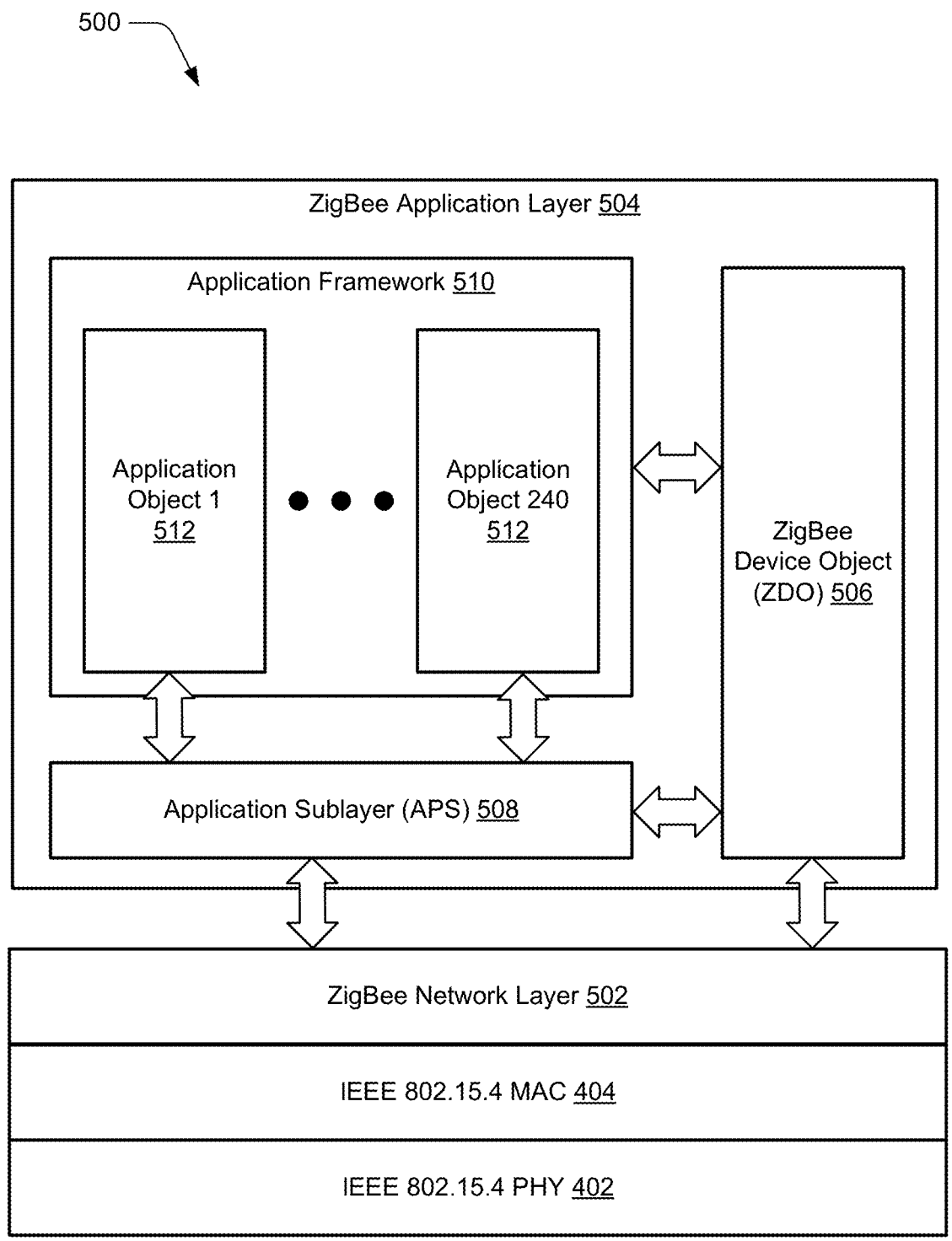
FIG. 5 illustrates an example of the stack architecture of the ZigBee wireless application protocol with which embodiments of efficient network stack for wireless application protocols can be implemented.

FIG. 5 illustrates the ZigBee stack architecture 500. The main functions of a ZigBee network layer 502 are to enable the correct use of the IEEE 802.15.4 MAC layer 404 and provide a suitable interface for use by the ZigBee application layer 504. The ZigBee network layer 502 includes two service access points (SAPs) for the ZigBee application layer 504. A network layer data entity SAP creates and manages network layer data units from the payload of the ZigBee application layer 504 and performs routing according to a current ZigBee network topology. A network layer management entity SAP is used to handle configuration of new devices and establish new networks. The network layer management entity SAP determines whether a neighboring device belongs to the network and discovers new neighbors and routers.

The routing protocol used by the ZigBee network layer 502 is Ad-hoc On-demand Distance Vector (AODV) routing. In order to find a destination device, a source device broadcasts a route request to all of its neighbors. The neighbors then broadcast the request to their neighbors, flooding the network until the destination device is reached. Once the destination device is reached, the destination device sends a route reply via unicast transmission following the lowest cost path back to the source device. Once the source device receives the reply, the source device updates its routing table for the destination address with a next hop in the path and a path cost.

The ZigBee application layer 504 is the highest-level layer defined by the ZigBee specification, and is the effective interface of the ZigBee system to its end users. The ZigBee application layer 504 includes a ZigBee Device Object 506, an application sublayer 508, and an application framework 510 that includes a number of application objects 512.

The ZDO 506 is responsible for overall device management, security keys, and policies. The ZDO 506 is responsible for defining the role of a device as either a coordinator or an end device, discovery of new devices on the network, and identification of services offered by the new devices. The ZDO 506 then establishes secure links with external devices and replies to binding requests.

The application support sublayer (APS) 508 works as a bridge between the ZigBee network layer 502 and the other components of the ZigBee application layer 504. The APS 508 maintains up-to-date binding tables in the form of a database, which can be used to find appropriate devices depending on the services that are needed by an application and offered by the devices in the network.

A ZigBee application may consist of communicating objects which cooperate to carry out desired tasks. The application object 512 comprises clusters that define specific functionality used by the application. ZigBee clusters are used to encode and interpret messages at the application layer and are described in greater detail in the section "ZigBee Cluster Library," below. The clusters in the application objects 512 communicate using the facilities provided by the APS 508 and are supervised by the ZDO 506.

Addressing is also part of the ZigBee application layer 504. A network node consists of an IEEE 802.15.4-conformant radio transceiver and one or more device descriptions, which are collections of attributes which can be polled or set, or which can be monitored through events. The transceiver is the base for addressing, and devices within a node are specified by an endpoint identifier in the range 1-240 that is associated with the base address of the transceiver.

ZigBee Device and Service Discovery

In order for applications to communicate, their comprising devices use a common application protocol that includes application profiles. The application profiles group together conventions for each application profile, such as types of messages, formats, attributes, and so forth. Devices that collaborate in an application are bound together by matching input and output cluster identifiers that are unique within the context of a given application profile and are associated to an incoming or outgoing data flow in a device. Binding defines relationships between two devices, specific end-points, and a cluster ID. Binding provides a mechanism for attaching an endpoint on one node to one or more endpoints on another node. The bindings are stored in binding tables of the bound devices and the tables contain source and destination pairings.

Device address and service discovery is performed by unicast and broadcast messaging. A coordinator in a ZigBee network assigns 16-bit network addresses to devices in the ZigBee network. When the 16-bit network address of a device is known, the unique, 64-bit, IEEE 802.15.4 address of the node address can be obtained using a unicast request. When the 16-bit network address of the device is not known, a petition is broadcast to obtain the IEEE address. The IEEE address of the device is included in the payload of a response to the broadcast petition. In response to receiving the broadcast petition, an end device responds with the IEEE address of the end device, while a network coordinator or a router will also send the addresses of all the devices associated with the network coordinator or router.

The discovery of services in a ZigBee network is performed by unicast and broadcast messaging. When the address of a device is known, descriptors of the services provided by the device can be directly requested using a unicast command to the device. To discover servers for particular services, a source device broadcasts a command to the ZigBee network to request locations of servers that provide the particular service. The servers that support the requested service respond with unicast messages to the source device indicating support for the requested service.

ZigBee Cluster Library

In ZigBee, related application-level commands and attributes are collected together in clusters that define an interface to specific functionality. ZigBee clusters are used to encode and interpret messages at the application layer Servers store the attributes of a cluster and a node that affects or manipulates the attributes of the cluster stored in a server is considered a client of that cluster. A client device sends commands to manipulate attributes of the server device. The server device sends responses for the commands to the client device.

The ZigBee Cluster Library (ZCL) is a repository for a number of clusters that define specific functionality. Some clusters are provided as a part of the ZigBee standard and provide commonly used functionality across application profiles or within a particular domain, such as a lighting control profile. Other clusters are created by product vendors to incorporate vendor-specific functionality. The clusters in the ZCL may be subdivided into functional domains, such as HVAC, lighting, security, and so forth. Profiles (or application profiles) are created by incorporating various clusters from the ZCL. For example, profiles may include Home Automation, Commercial Building Automation, Smart Energy, Telecommunication Applications, and the like.

During service discovery, a simple descriptor in a server is queried to obtain information about the server and what clusters the server supports. The clusters supported by an application object within an application profile are identified through the simple descriptor. In the simple descriptor, the application input cluster list contains the list of server clusters supported on the server device and an application output cluster list contains a list of client clusters supported on the server device.

ZigBee over the Efficient Network Stack

FIG. 6 illustrates an example 600 of the efficient network stack 400 for wireless application protocols with ZigBee as the application protocol using the efficient network stack. As previously discussed, the ZigBee application objects 512 include clusters that encode and interpret messages at the ZigBee application layer 504. Incoming messages are received at a physical radio in the IEEE 802.15.4 physical (PHY) layer 402 layer, are processed upward through the layers of the efficient network stack 400 to the ZigBee application layer 504, where the messages are interpreted using clusters in the ZCL.

To send and receive messages, ZigBee devices use 802.15.4 16-bit network addresses for source addresses and destination addresses. When a message is passed down from a cluster in the ZigBee application layer 504, the efficient network stack 400 converts the 802.15.4 16-bit network addresses to IPv6 addresses that maps to the 802.15.4 16-bit network addresses.

Alternatively, the clusters in the ZigBee application layer 504 may use 64-bit IEEE addresses for source addresses and destination addresses. When a message is passed down from a cluster in the ZigBee application layer 504, the efficient network stack 400 converts the 64-bit IEEE addresses to IPv6 addresses that maps to the 64-bit IEEE addresses.

Figure 7:
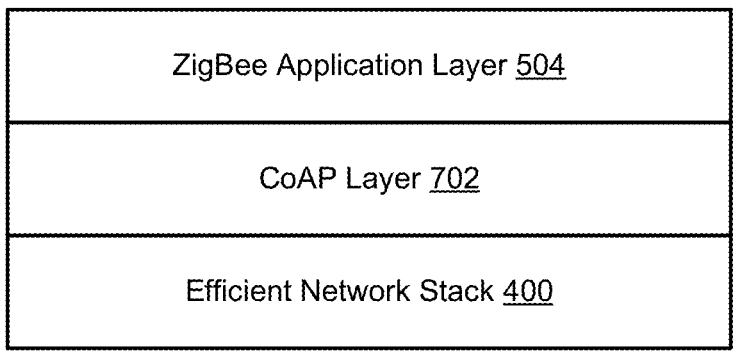
FIG. 7 illustrates an example embodiment of the efficient network stack for wireless application protocols with ZigBee as the application protocol in accordance with embodiments of efficient network stack for wireless application protocols.

FIG. 7 illustrates an example 700 of the efficient network stack for wireless application protocols with ZigBee as the application protocol using the efficient network stack 400. Alternatively, reliable messaging with retry, for messages from the ZigBee application layer 504 uses a Constrained Application Protocol (CoAP) layer 702. CoAP provides reliable messaging over UDP with confirmable messages, as well as acknowledgement and reset response messages. CoAP has IANA-assigned port number 5638 and port number 5684 for CoAP secured by DTLS. Some embodiments of the devices using CoAP with ZigBee over the efficient network stack 400 may use a predefined port for communication, by way of example and not limitation, port 6116. For example, a ZigBee server listens to the predefined port for a message that is a message using CoAP. Alternatively to a predefined port, the devices may use a multicast domain name system (mDNS) to resolve port numbers to host names by broadcasting a request for port addresses for ZigBee applications using CoAP with ZigBee over the efficient network stack 400. Thus, each host device may assign its own ports and may use different ports than other devices in the network. In some embodiments, there may be a parent router for a sleepy, child end device that response for the sleepy, child end device when the mDNS broadcast arrives during a sleep state of the child end device.

Additionally in an embodiment, messages from the ZigBee application layer 504 are serialized before transmission. For example, messages from the from the ZigBee application layer 504 are serialized using Concise Binary Object Representation (CBOR), Protocol Buffers, or any other suitable serialization format.

Additionally or alternatively, devices may also respond with messages that indicate whether the devices support ZigBee over the efficient network stack 400. Such polling may be used to determine a device description for the devices rather than only what device ports correspond to ZigBee over the efficient network stack 400. In some embodiments, a response to the mDNS polling may be used as an indication that the device supports ZigBee over the efficient network stack 400 along with the port that is used during such communications.

The ZigBee coordinator is a unique device in each ZigBee network that establishes the ZigBee network and stores network information including network keys. The leader 216 in a fabric network performs similar services for the fabric network. In an embodiment, when ZigBee devices communicate using the efficient network stack 400, the leader 216 of the fabric network also acts as the coordinator for the ZigBee devices.

Z-Wave Over the Efficient Network Stack

Z-wave's® is a protocol for a wireless network for communication among home automation devices. The MAC and PHY layers of the Z-wave® standard are specified in International Telecommunication Union Recommendation ITU-T G9959. The Network layer and Application interface sublayer are proprietary and specified by Sigma Designs of Milpitas, Calif.

The Z-wave network operates as a mesh network that can contain up to two-hundred, thirty two (232) nodes. A central, network controller, manages, and is used to setup, each Z-wave network. Each node added to a Z-wave network is "included" in the Z-wave network before it can operate in the Z-wave network. Each Z-wave network is identified by a Network ID and each device is further identified by a Node ID. The Network ID or Home ID is the common identification of all nodes belonging to one logical Z-wave network. In an embodiment, when Z-Wave devices communicate using the efficient network stack 400, the leader 216 of the fabric network also acts as the controller for the Z-Wave network.

Figure 8:
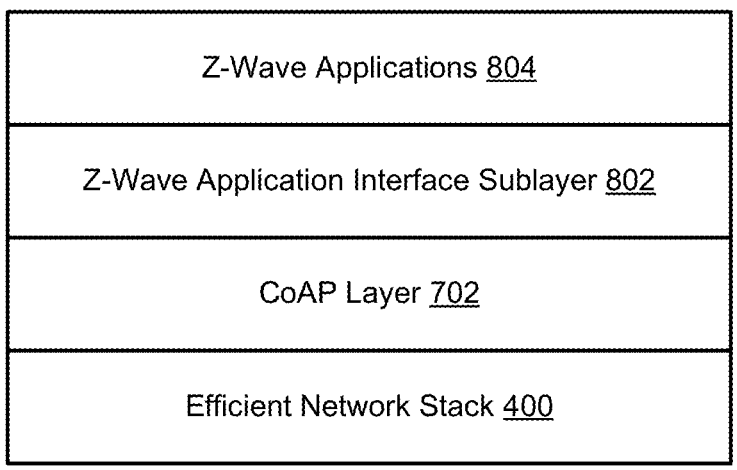
FIG. 8 illustrates an example embodiment of the efficient network stack for wireless application protocols with Z-Wave as the application protocol in accordance with embodiments of efficient network stack for wireless application protocols.

FIG. 8 illustrates an example 800 of the efficient network stack for wireless application protocols with Z-Wave as the application protocol using the efficient network stack 400. The efficient network stack 400 replaces the physical layer 302, data link layer 304, network layer 308, and transport layer 308 of Z-wave to transport Z-wave application frames over an IPv6, fabric network. In an example, the Z-Wave application interface sublayer 802 and Z-Wave applications 804 communicate using the efficient network stack 400. Optionally, the CoAP layer 702 may be included to provide reliable messaging for Z-Wave transfer acknowledgments.

AllJoyn Over Thread

AllJoyn® is a system that provides a software framework and core set of system services for client-server communication among devices using a distributed software bus (D-Bus) over IP networks. Applications use the distributed software bus to communicate via published application program interfaces (APIs). Applications that publish APIs are producers (servers) and applications consuming the APIs are consumers (clients). AllJoyn bus formation is ad-hoc and is independent of the underlying (typically IP-based) network.

Nodes in an AllJoyn network can be applications, routers, or applications that contain a router. Applications can only connect to routers, and routers can connect to other routers, to form a mesh network topology.

Figure 9:
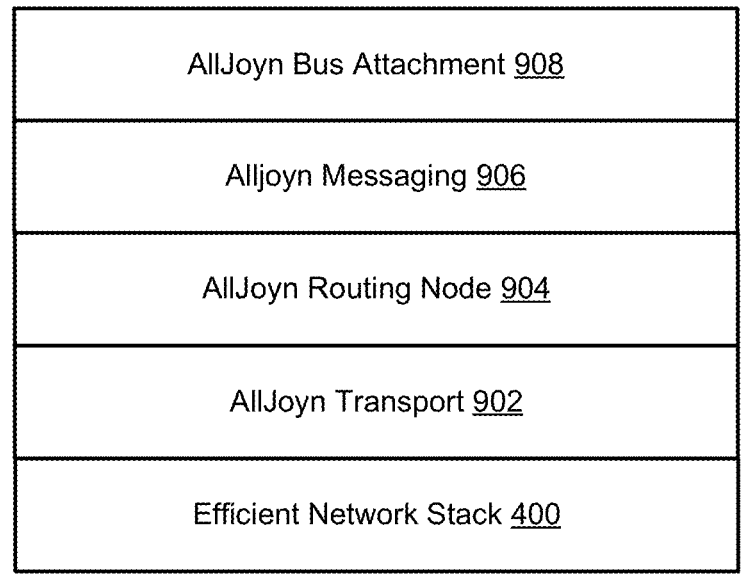
FIG. 9 illustrates an example of the efficient network stack for wireless application protocols with AllJoyn as the application protocol in accordance with embodiments of efficient network stack for wireless application protocols.

FIG. 9 illustrates an example 900 of the efficient network stack for wireless application protocols with AllJoyn as the application protocol using the efficient network stack 400. The efficient network stack 400 provides the physical layer 302, data link layer 304, network layer 308, and transport layer 308 over which applications using an AllJoyn transport layer 902, an AllJoyn routing node layer 904, an AllJoyn messaging layer 906, and an AllJoyn bus attachment layer 908 communicate between devices.

OIC Over Thread

The Open Interconnect Consortium (OIC) specification defines a framework for interaction among devices and applications (entities) for multiple application-specific profiles. Each entity may expose resources, with unique identifiers (URIs) and operations associated with each resource. Each operation can have an initiator (client) of the operation and a responder (server) for the operation.

Figure 10:
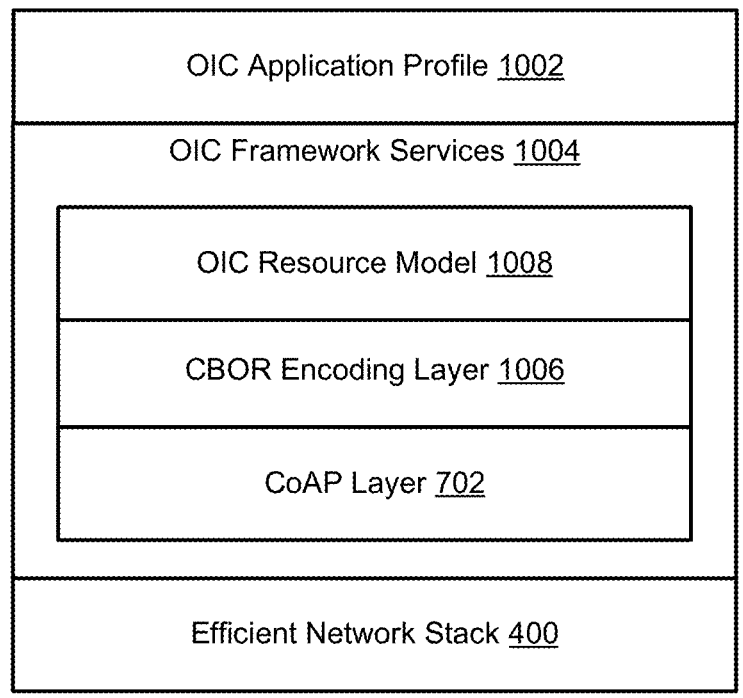
FIG. 10 illustrates an example of the efficient network stack for wireless application protocols with OIC as the application protocol in accordance with embodiments of efficient network stack for wireless application protocols.

FIG. 10 illustrates an example 1000 of an efficient network stack for wireless application protocols with OIC as the application protocol using the efficient network stack 400. The efficient network stack 400 provides the physical layer 302, data link layer 304, network layer 308, and transport layer 308 over which the OIC application profile 1002 communicates using the OCI framework services 1004. The OCI framework services 1004, includes the CoAP layer 702, a Concise Binary Object Representation (CBOR) encoding layer 1006, and an OIC Resource Model.

Examples of OIC application profiles are a smart home profile, a connected health profile, an automotive profile, and so forth. An OIC application profile 1002 uses a set of OIC framework services 1004 to communicate between OIC devices. The OIC framework services 1004 connect OIC devices over the physical layer 302, data link layer 304, network layer 308, and transport layer 308.

The OIC framework services 1004 consists of functions which provide core functionalities for OIC operation. Identification and Addressing defines the identifier and addressing capability. Discovery defines the process for discovering available OIC Devices and OIC Resources. Resource model specifies the capability for representation of the entities in terms of resources and defines mechanisms for manipulating the resources. Create, Read, Update, Delete, and Notify (CRUDN) provides a generic scheme for the interactions between an OIC Client and OIC Server. Messaging provides specific message protocols for RESTful operation, i.e. CRUDN interactions. Device management specifies the discipline of managing the capabilities of an OIC Device and includes device provisioning and initial setup as well as device monitoring and diagnostics. Security includes authentication, authorization, and access control mechanisms required for secure access to the entities.

The Fabric Network Over the Efficient Network Stack

The fabric network, as described above, comprises an efficient platform layer, and/or an efficient application layer that use the efficient network stack 400. The fabric network enables numerous devices within a home to communicate with each other using one or more logical networks, as well as communicate over the Internet to services, such as the cloud service 208.

Figure 11:
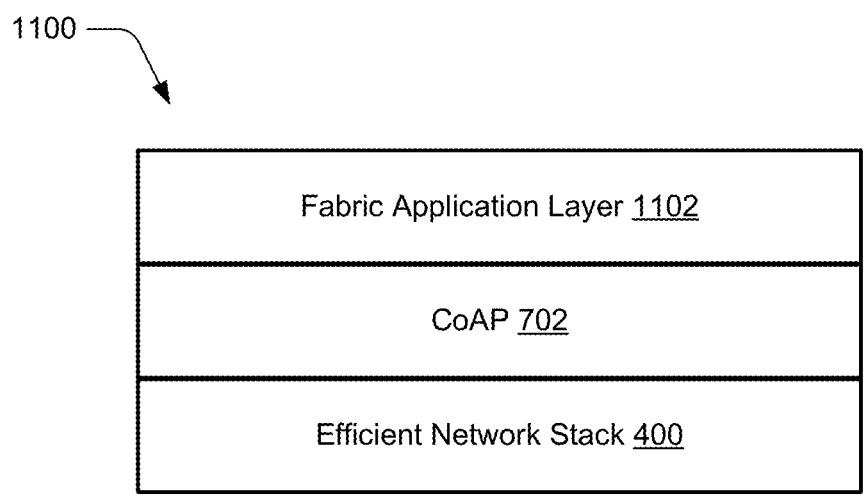
FIG. 11 illustrates an example of the efficient network stack for wireless application protocols with the fabric network as the application protocol in accordance with embodiments of efficient network stack for wireless application protocols.

FIG. 11 illustrates an example 1100 of the efficient network stack for wireless application protocols with the fabric network application layer 1102 as the application protocol using the efficient network stack 400. The efficient fabric network stack 400 provides the physical layer 302, data link layer 304, network layer 308, and transport layer 308, over which the fabric network application layer 1102 communicates. The platform layer 310 of the fabric network is the CoAP layer 702 that provides the messaging connectivity between devices in the fabric network.

Migration Process

To transition a network running a wireless application protocol to run the wireless application protocol using the efficient network stack 400, there are several methods of transitioning the devices in the network based on the capabilities of each device. In the case where every network device has sufficient resources (e.g. memory, processor power, a compatible radio transceiver) the entire network can be transitioned at once, such as by an out-of-band upgrade of each node or propagating a firmware upgrade over the network to each node. For example, devices in a ZigBee network are upgraded by using the ZigBee OTA Upgrade Cluster Interface to install a new firmware image in the devices that replaces the lower layers of the ZigBee protocol stack with the efficient network stack 400.

There are cases where some network nodes lack sufficient resources to upgrade to the efficient network stack 400. For example, a ZigBee end device with insufficient memory may not be able to accept the upgrade. In this case, routers in the network are upgraded to support dual-stack operation. The dual-stack router supports both the original wireless application protocol stack and the wireless application protocol running on the efficient network stack 400.

Figure 12:
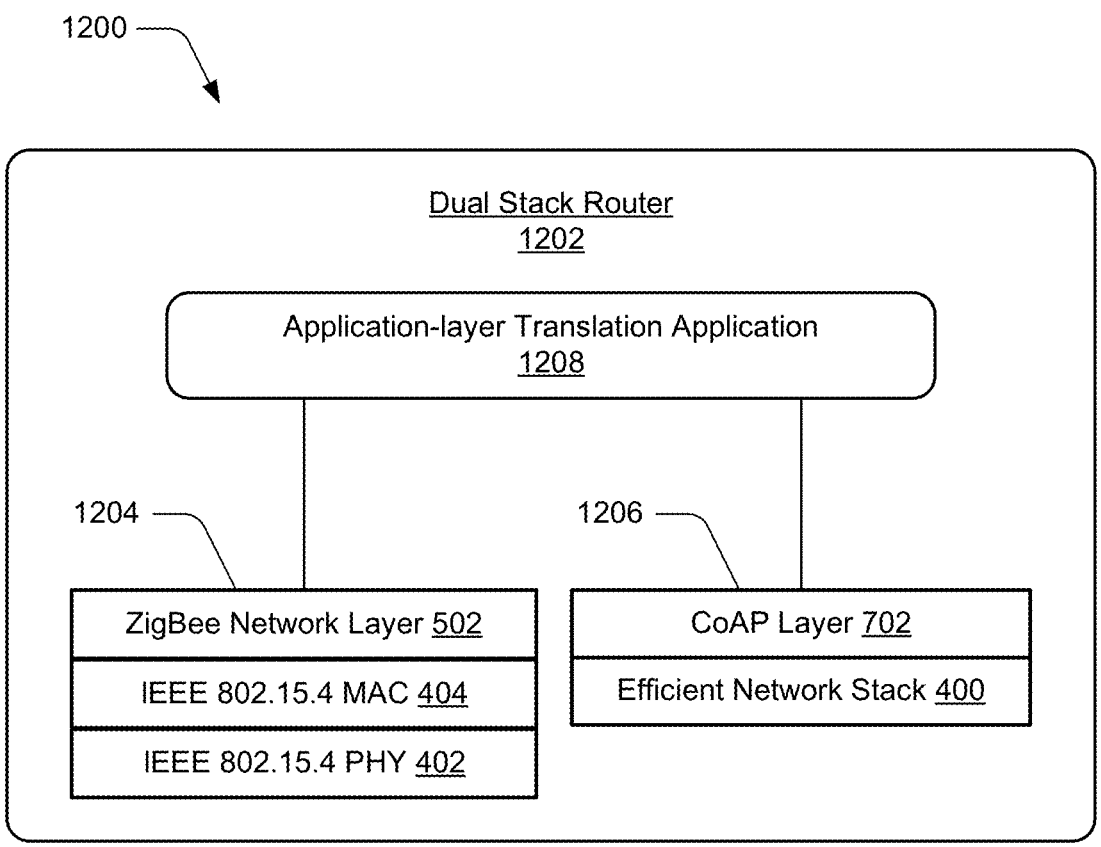
FIG. 12 illustrates an example embodiment of a dual-stack router in accordance with embodiments of efficient network stack for wireless application protocols.

FIG. 12 illustrates an example 1200 of a dual-stack router 1202 using the efficient network stack 400 for wireless application protocols. Although the dual-stack router 1202 is shown with a ZigBee stack, any wireless protocol stack may be used along with the efficient network stack 400. The dual-stack router 1202 includes the IEEE 802.15.4 PHY layer 402, the IEEE 802.15.4 MAC layer 404, and the ZigBee network layer 502 for ZigBee communication using the first network stack, shown at 1204. The dual-stack router 1202 also includes the efficient network stack 400 and the CoAP layer 702 for fabric network communication using the second network stack, shown at 1206. The two network stacks, 1204 and 1206, are connected to an application-layer translation application 1208 that maps addresses between the two wireless application protocols, relays discovery messages and responses, and the like. For example, the dual stack router 1202 enables a resource-limited ZigBee end device to communicate as a part of the fabric network by translating communication between the resource-limited ZigBee end device and fabric-network devices in the dual-stack router 1202.

Additionally, the dual-stack router 1202 enables two networks to run in parallel over mesh network nodes. The dual-stack router 1202 uses each stack independently to route packets for each network. For example, one set of nodes in the network operates as a ZigBee network and another set of nodes operates as a fabric network. Some nodes may participate in only one network, while other nodes may participate in both networks.

Alternatively, the dual-stack router 1202 may include two radio transceivers, one for each stack, to bridge between different networks. For example, a bridge device may have two radio transceivers to bridge a Z-Wave network, which operates in the 915 MHz ISM band, to a fabric network, which operates in the 2.4 GHz ISM band. In another alternative, a single radio is shared between the two stacks on a time-sliced schedule to allocate the radio to each network stack for alternating periods of time.

Application Profile Gateway

Figure 13:
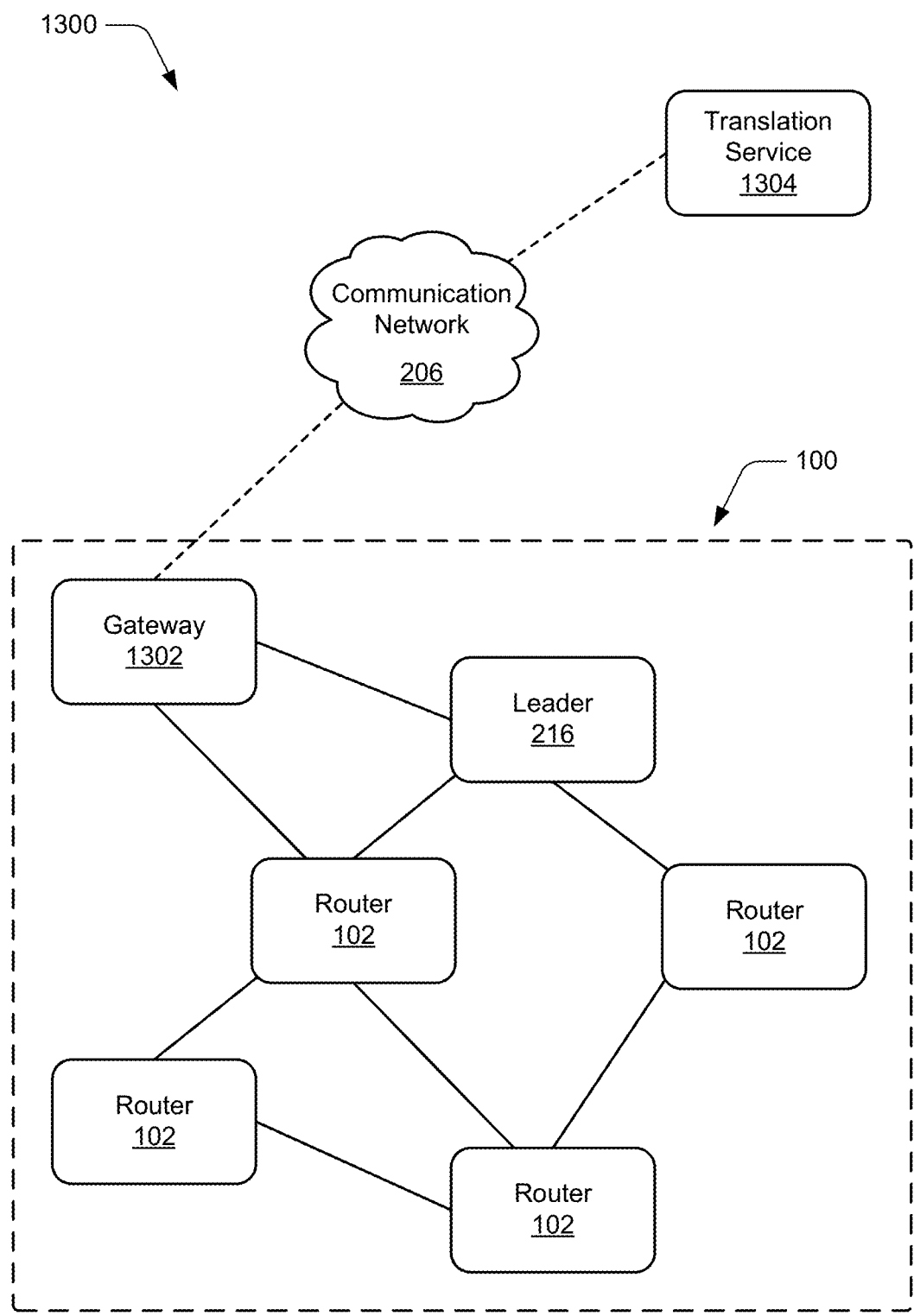
FIG. 13 illustrates an example embodiment of a gateway and a translation service in accordance with embodiments of efficient network stack for wireless application protocols.

FIG. 13 illustrates an example environment 1300 illustrating the operation of a gateway and a translation service using the efficient network stack for wireless application protocols. The function of the application-layer translation application 1208 need not be located within the mesh network 100. A mesh network device, such as the border router 202, is used as a gateway 1302 to forward application-layer messages, via the communication network 206, to a translation service 1304. For example, a ZigBee application-layer message in an IEEE 802.15.4 network is forwarded through the gateway 1302 to the translation service 1304, which performs the function of the application-layer translation application 1208. At the translation service 1304, the ZigBee application-layer message is translated for transmission using the efficient network stack 400. The translation service 1304 forwards the translated application-layer message to the gateway 1302. The gateway 1302 then transmits the translated message using the efficient network stack 400 over the mesh network 100.

The availability and address of the gateway 1302 may be included in network data that is maintained and propagated by the leader 216 in the mesh network 100. Alternatively the availability and address of the gateway 1302 is discovered using as service discovery protocol, for example mDNS. For example, any router 102 that receives a ZigBee message uses the address of the gateway 1302 to forward the received ZigBee message over the fabric network to the gateway 1302. The gateway 1302 forwards the received ZigBee message over the communication network 206 to the translation service. The gateway receives the response from the translation service 1304 and forwards the translated message in the response over the fabric network to its destination. Alternatively, the gateway 1302 forwards the response from the translation service 1304 to the router 102 that forwarded the ZigBee message to the gateway 1302.

While the translation service 1304 may translate all received messages, the translation service can be associated with a particular application profile. For example, a ZigBee message carrying a payload that is associated with the home automation profile is sent to a translation service 1304 that only translates messages for the home automation profile. Another translation service 1304 may be associated with smart energy, commercial building automation, and so forth. The gateway 1302 identifies the application profile from the received ZigBee message and forwards received ZigBee message to the appropriate translation service 1304. The translation service 1304 may be associated with a standard application profile or a vendor-specific profile.

A mapping of application profiles to translation services 1304 is maintained by the leader 216, the gateway 1302, and/or by one or more border routers 202, for example in a table, database, and so forth. The mapping may be provisioned into the leader 219, the gateway 1302, and/or the one or more border routers 202 during commissioning by a network commissioner either executing a provisioning application on the commissioning device or by a provisioning service in the cloud.

Service and Address Discovery

Service discovery in a mesh network may only extend locally within the mesh network. A node in a mesh network 100 may broadcast or flood the mesh network to request for any nodes providing a particular service or supporting a particular application profile to respond with a message that identifies the node providing the service. For example, the ZigBee Device Object (ZDO) 506 supports device (address) and/or service discovery one ZigBee devices within the address scope of a single ZigBee mesh network.

This type of service discovery mechanism is effective within a single mesh network but does not scale well outside local address scope of the mesh network. For example, a user may want to use an application on a mobile device to control devices at multiple locations, such as home, an office, and/or a vacation home, which are on isolated mesh networks. The fabric network has a mesh-local scope that is based on IPv6 addressing of nodes in a fabric network that can be used with the efficient network stack 400 to extend service discovery beyond a mesh network in a single, physical location. The mesh-local scope of the fabric network is described in U.S. patent application Ser. No. 14/798,448 entitled "Mesh Network Addressing" filed Jul. 13, 2015, the disclosure of which is incorporated by reference herein in its entirety.

Figure 14:
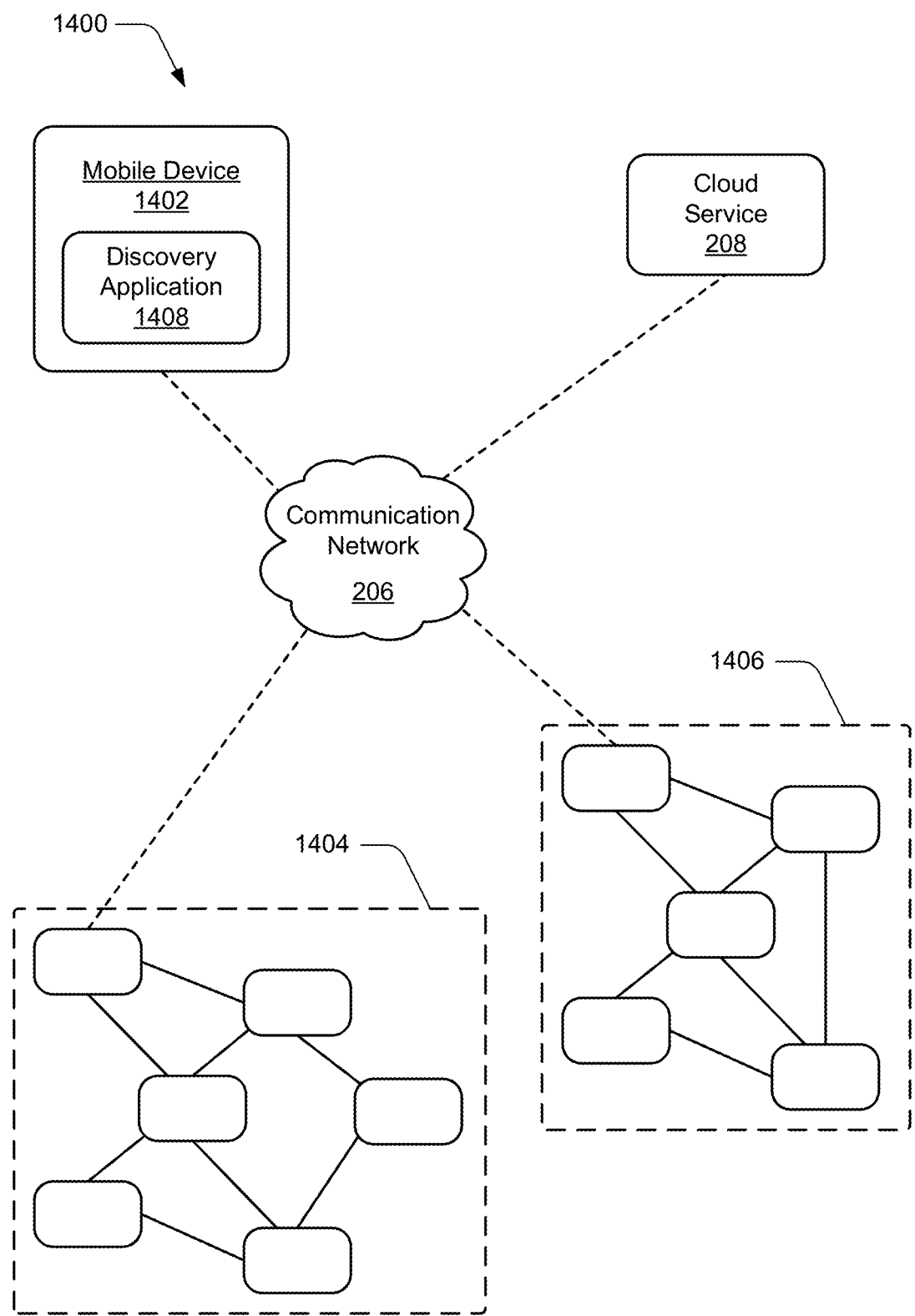
FIG. 14 illustrates an example embodiment of service discovery in accordance with embodiments of efficient network stack for wireless application protocols.

FIG. 14 illustrates an environment 1400 for service discovery across multiple mesh networks. A mobile device 1402 connects via a communication network 206 to a first mesh network 1404 and to a second mesh network 1406. The mesh networks 1404, 1406 can be logically-separate mesh networks and/or physically-separate mesh networks, for example at different geographic locations. The mobile device includes a discovery application 1408 for control of mesh network devices that share a common application profile. Some of the mesh network devices in the mesh networks 1404, 1406 and the discovery application 1408 supports the common application profile, such as a ZigBee lighting control profile. In the mesh network devices of the mesh networks 1404 and 1406, the application profile and associated ZCLs run on the efficient network stack 400 within a common mesh-local address scope, using any of the embodiments described above. The discovery application 1408 initiates service discovery for a service using the services of the ZDO in the mobile device 1402. A service discovery message is sent over the fabric network using broadcast or multicast messaging to the mesh networks 1404 and 1406, causing the service discovery message propagate or flood through the nodes of the mesh networks 1404 and 1406. Any devices supporting the requested service respond to the discovery application 1408. Following the completion of the service discovery process, the discovery application 1408 can communicate with the discovered nodes and control devices in both mesh networks 1404 and 1406.

Example methods 1500 through 1800 are described with reference to respective FIGS. 15-18 in accordance with one or more embodiments of the efficient network stack for wireless application protocols. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 15:
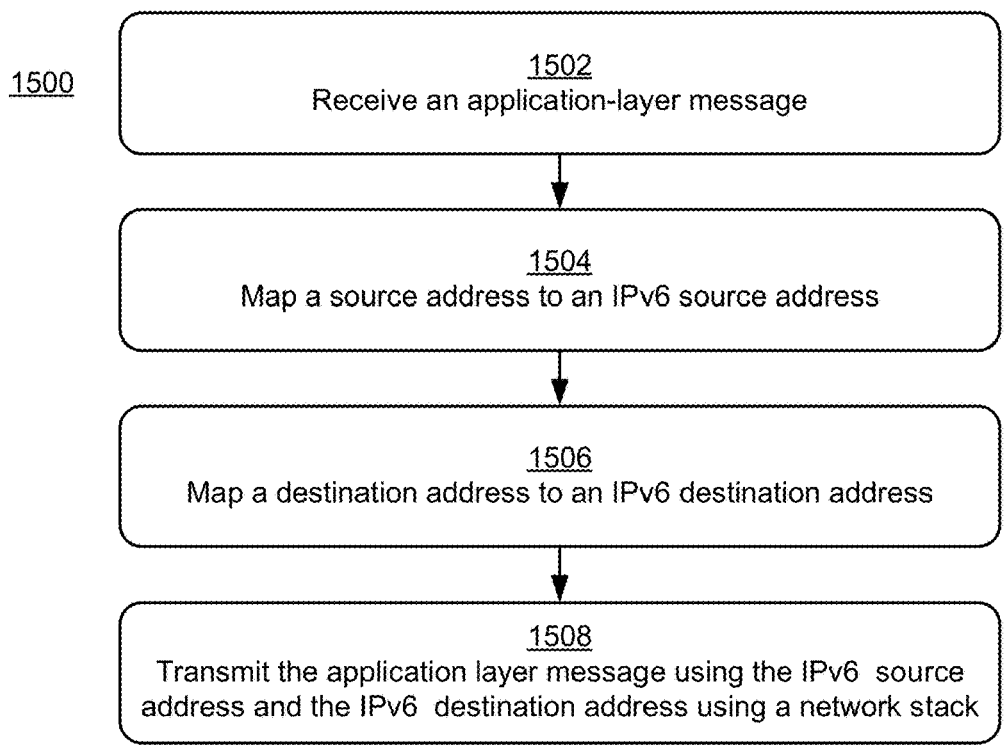
FIG. 15 illustrates an example method of efficient network stack for wireless application protocols as generally related to application-layer message translation in accordance with embodiments of the techniques described herein.

FIG. 15 illustrates example method(s) 1500 of the efficient network stack for wireless application protocols as generally related to communicating application messages using a network stack in a mesh network. The order in which the method blocks are described are not intended to be construed as a limitation, and any number of the described method blocks can be combined in any order to implement a method, or an alternate method.

At block 1502, a network stack in a mesh network device receives an application-layer message for an application, at an application layer. For example, the efficient network stack 400 receives an application-layer message from an application in the application layer 312.

At block 1504, the network stack maps a source address in the application-layer message to an IPv6 source address. For example, the efficient network stack 400 determines a mapping of a source address included in the application-layer message to a corresponding IPv6 source address.

At block 1506, the network stack maps a destination address in the application-layer message to an IPv6 destination address. For example, the efficient network stack 400 determines a mapping of a destination address included in the application-layer message to a corresponding IPv6 destination address.

At block 1508, the mesh network device transmits the application-layer message using the IPv6 source address and the IPv6 destination address and using the network stack. For example, the efficient network stack 400 transmits the application-layer message using the IPv6 source address and the IPv6 destination address over the mesh network 100.

Figure 16:
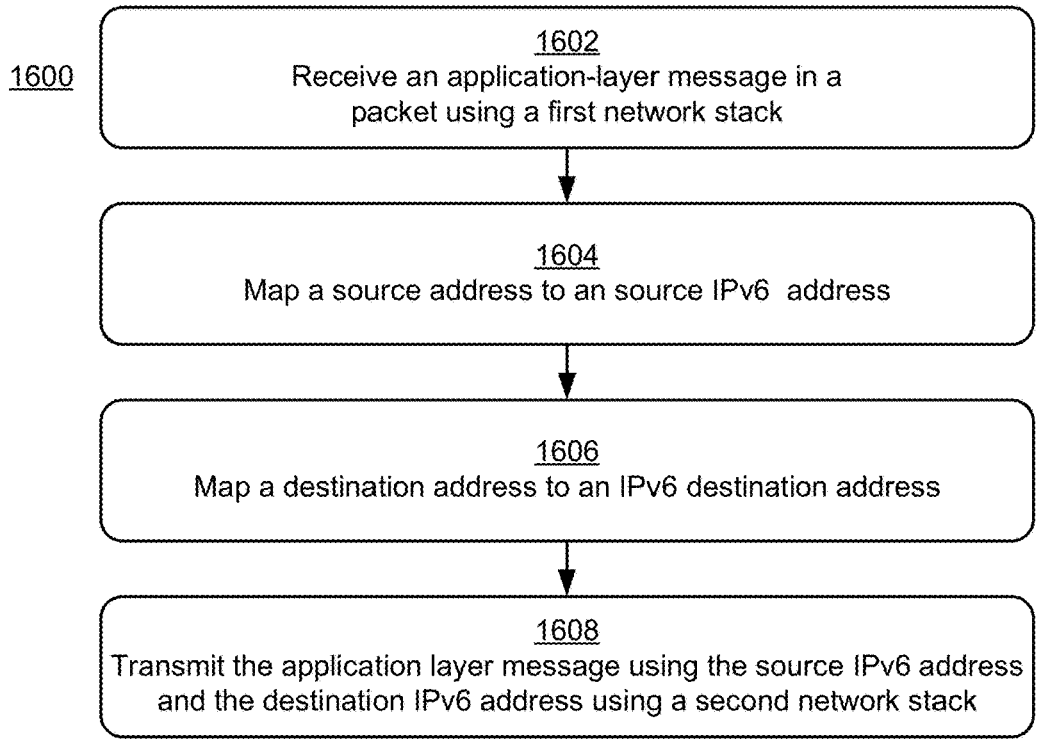
FIG. 16 illustrates another example method of efficient network stack for wireless application protocols as generally related to application-layer message translation in accordance with embodiments of the techniques described herein.

FIG. 16 illustrates example method(s) 1600 of the efficient network stack for wireless application protocols as generally related to communicating application messages using a network stack in a mesh network. The order in which the method blocks are described are not intended to be construed as a limitation, and any number of the described method blocks can be combined in any order to implement a method, or an alternate method.

At block 1602, a first network stack in a mesh network device receives a packet including an application-layer message. For example, an application-specific network stack 1204 receives a packet over the mesh network 100 that includes an application-layer message and passes the application-layer message to the application-layer translation application 1208.

At block 1604, a translation application maps a source address in the application-layer message to an IPv6 source address. For example, the application-layer translation application 1208, determines a mapping of a source address included in the application-layer message to a corresponding IPv6 source address.

At block 1606, the translation application maps a destination address in the application-layer message to an IPv6 destination address. For example, the application-layer translation application 1208 determines a mapping of a destination address included in the application-layer message to a corresponding IPv6 destination address.

At block 1608, the mesh network device transmits the application-layer message using the IPv6 source address and the IPv6 destination address and using the second network stack. For example at 1206, the efficient network stack 400 receives the translated application layer-message from application-layer translation application 1208 and transmits the application-layer message using the IPv6 source address and the IPv6 destination address.

Figure 17:
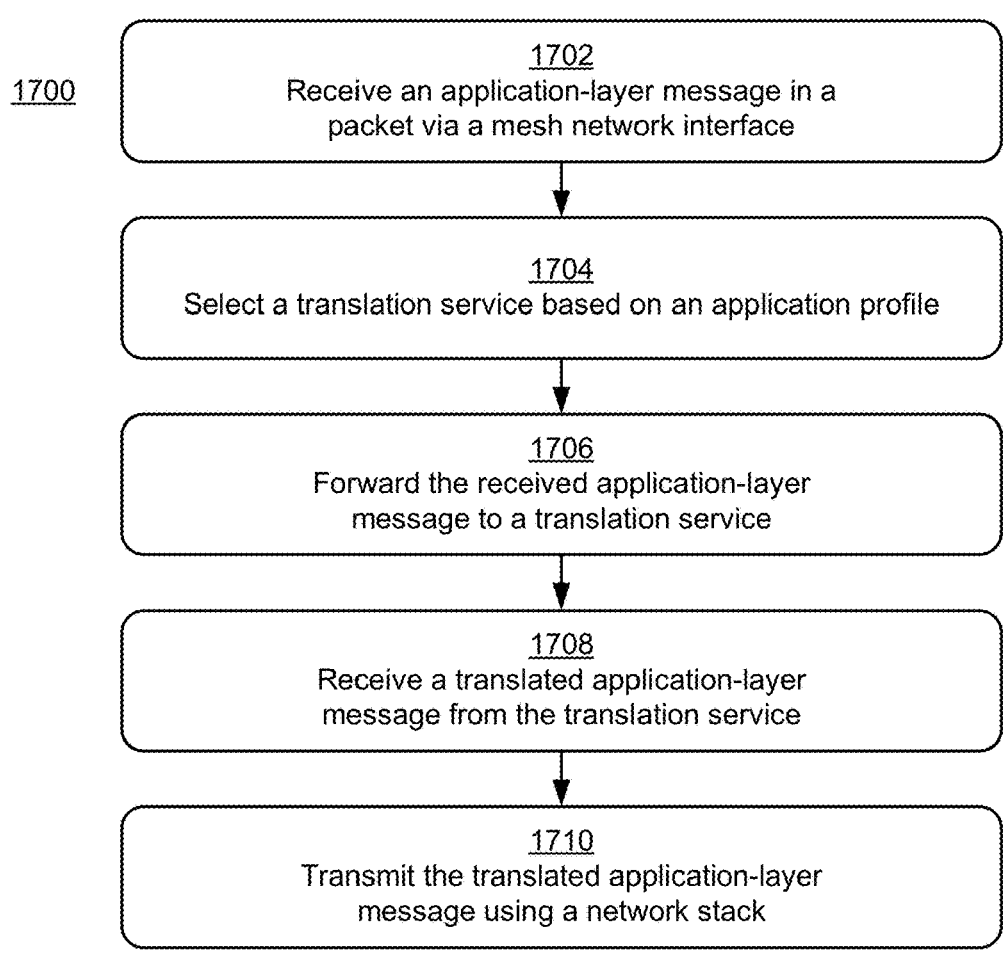
FIG. 17 illustrates another example method of efficient network stack for wireless application protocols as generally related to application-layer message translation in accordance with embodiments of the techniques described herein.

FIG. 17 illustrates example method(s) 1700 of efficient network stack for wireless application protocols as generally related to using a gateway for translating application messages using a network stack in a mesh network. The order in which the method blocks are described are not intended to be construed as a limitation, and any number of the described method blocks can be combined in any order to implement a method, or an alternate method.

At block 1702, a gateway receives an application-layer message in a packet via a mesh network interface. For example, a gateway 1302 receives a packet over mesh network 100 that includes an application-layer message.

Optionally, at block 1704, the gateway selects a translation service based on an application profile. For example, the gateway 1302 determines a type of application profile from the contents of the received application-layer message and selects the translation service 1304 that is mapped to the application profile.

At block 1706, the gateway forwards the received application-layer message to a translation service. For example, the gateway 1302 forwards the received application-layer message over an external network interface to a translation service 1304. The translation service 1304 determines mappings of a source address and a destination address included in the application-layer message to a respective IPv6 source address and IPv6 destination address.

At block 1708, the gateway receives a translated application-layer message from the translation service. For example, the gateway 1302 receives a translated application-layer message, which includes the IPv6 source address and the IPv6 destination address, from the translation service 1304.

At block 1710, the gateway transmits the translated application-layer message using the IPv6 source address and the IPv6 destination address and using a network stack. For example, the gateway 1302 transmits the translated application-layer message over the mesh network 100 using the efficient network stack 400.

Figure 18:
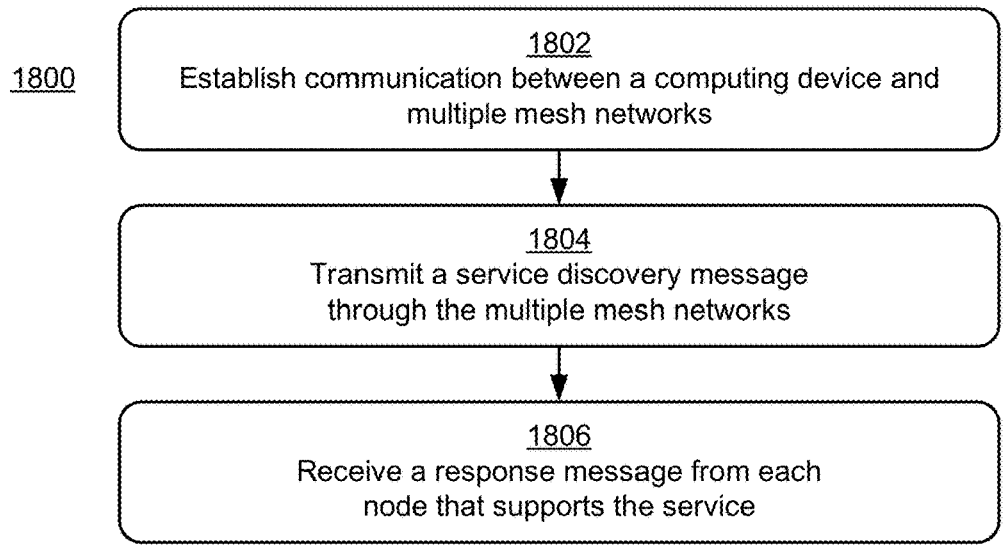
FIG. 18 illustrates an example method of efficient network stack for wireless application protocols as generally related to service discovery in accordance with embodiments of the techniques described herein.

FIG. 18 illustrates example method(s) 1800 of efficient network stack for wireless application protocols as generally related to service discovery in a mesh network. The order in which the method blocks are described are not intended to be construed as a limitation, and any number of the described method blocks can be combined in any order to implement a method, or an alternate method.

At block 1802, a computing device establishes communication to multiple mesh networks. For example, the mobile device 1402 establishes communication via the communication network 206 to the mesh network 1404 and the mesh network 1406, such as through the border routers 202.

At block 1804, the computing device transmits a service discovery message through the mesh networks. For example, the service discovery application 1408 transmits a service discovery message from the mobile device 1402 to the mesh networks 1404 and 1406, which is effective to propagate the service discovery message to the nodes of the mesh networks 1404 and 1406.

At block 1806, the computing device receives a response message from each node in the mesh networks that supports the service. For example, the mobile device 1402 receives a response message from each node in the mesh networks 1404 and 1406 that support the service indicated in the service discovery message.

Figure 19:
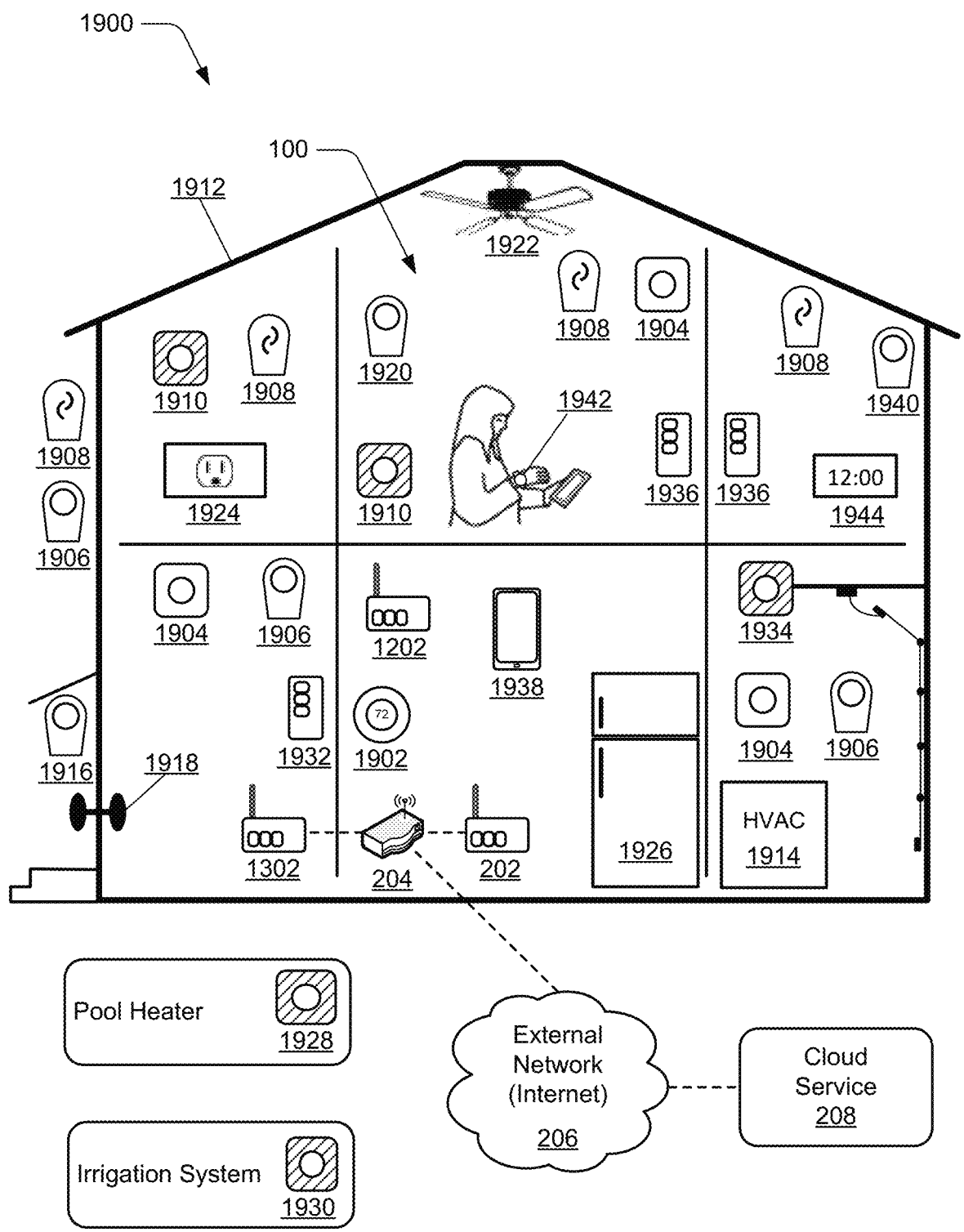
FIG. 19 illustrates an example environment in which a mesh network can be implemented in accordance with embodiments of the techniques described herein.

FIG. 19 illustrates an example environment 1900 in which the mesh network 100 (as described with reference to FIG. 1), and embodiments of efficient network stack for wireless application protocols can be implemented. Generally, the environment 1900 includes the mesh network 100 implemented as part of a smart-home or other type of structure with any number of mesh network devices that are configured for communication in a mesh network. For example, the mesh network devices can include a thermostat 1902, hazard detectors 1904 (e.g., for smoke and/or carbon monoxide), cameras 1906 (e.g., indoor and outdoor), lighting units 1908 (e.g., indoor and outdoor), and any other types of mesh network devices 1910 that are implemented inside and/or outside of a structure 1912 (e.g., in a smart-home environment). In this example, the mesh network devices can also include any of the previously described devices, such as a gateway device 1302, a border router 202, a dual-stack router 1202, as well as any of the devices implemented as a router 102, and/or an end device 106.

In the environment 1900, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 20.

In implementations, the thermostat 1902 may include a Nest® Learning Thermostat that detects ambient climate characteristics (e.g., temperature and/or humidity) and controls a HVAC system 1914 in the smart-home environment. The learning thermostat 1902 and other smart devices "learn" by capturing occupant settings to the devices. For example, the thermostat learns preferred temperature setpoints for mornings and evenings, and when the occupants of the structure are asleep or awake, as well as when the occupants are typically away or at home.

A hazard detector 1904 can be implemented to detect the presence of a hazardous substance or a substance indicative of a hazardous substance (e.g., smoke, fire, or carbon monoxide). In examples of wireless interconnection, a hazard detector 1904 may detect the presence of smoke, indicating a fire in the structure, in which case the hazard detector that first detects the smoke can broadcast a low-power wake-up signal to all of the connected mesh network devices. The other hazard detectors 1904 can then receive the broadcast wake-up signal and initiate a high-power state for hazard detection and to receive wireless communications of alert messages. Further, the lighting units 1908 can receive the broadcast wake-up signal and activate in the region of the detected hazard to illuminate and identify the problem area. In another example, the lighting units 1908 may activate in one illumination color to indicate a problem area or region in the structure, such as for a detected fire or break-in, and activate in a different illumination color to indicate safe regions and/or escape routes out of the structure.

In various configurations, the mesh network devices 1910 can include an entryway interface device 1916 that functions in coordination with a network-connected door lock system 1918, and that detects and responds to a person's approach to or departure from a location, such as an outer door of the structure 1912. The entryway interface device 1916 can interact with the other mesh network devices based on whether someone has approached or entered the smart-home environment. An entryway interface device 1916 can control doorbell functionality, announce the approach or departure of a person via audio or visual means, and control settings on a security system, such as to activate or deactivate the security system when occupants come and go. The mesh network devices 1910 can also include other sensors and detectors, such as to detect ambient lighting conditions, detect room-occupancy states (e.g., with an occupancy sensor 1920), and control a power and/or dim state of one or more lights. In some instances, the sensors and/or detectors may also control a power state or speed of a fan, such as a ceiling fan 1922. Further, the sensors and/or detectors may detect occupancy in a room or enclosure, and control the supply of power to electrical outlets or devices 1924, such as if a room or the structure is unoccupied.

The mesh network devices 1910 may also include connected appliances and/or controlled systems 1926, such as refrigerators, stoves and ovens, washers, dryers, air conditioners, pool heaters 1928, irrigation systems 1930, security systems 1932, and so forth, as well as other electronic and computing devices, such as televisions, entertainment systems, computers, intercom systems, garage-door openers 1934, ceiling fans 1922, control panels 1936, and the like. When plugged in, an appliance, device, or system can announce itself to the mesh network as described above, and can be automatically integrated with the controls and devices of the mesh network, such as in the smart-home. It should be noted that the mesh network devices 1910 may include devices physically located outside of the structure, but within wireless communication range, such as a device controlling a swimming pool heater 1928 or an irrigation system 1930.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices 1938, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 1902 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

In various configurations, devices inside and/or outside the structure 1912 may use any of the variety of wireless protocols and interoperate over the fabric network using the efficient network stack 400. In an embodiment, a ZigBee device senses a condition and communicates that condition to a device that operates natively on the fabric network. For example, the garage door opener 1934 that supports a ZigBee application profile, such as the home automation profile, senses that the garage door is opening and/or that there is a change in occupancy in the garage. The ZigBee application in the garage door opener 1934 communicates the sensed change over the fabric network using the efficient network stack 400 to the learning thermostat 1902. The learning thermostat 1902 responds to the change sensed by the garage door opener 1934 and adjusts the temperature set-point for the home.

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 1940 detects that the room is dark and when the occupancy sensor 1920 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 1908 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 1908 that lead to a safe exit. The light units 1908 may also be turned-on to indicate the direction along an exit route that a person should travel to safely exit the structure.

The various mesh network devices may also be implemented to integrate and communicate with wearable computing devices 1942, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 1910 may also include a smart alarm clock 1944 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1902 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 1902 so as to pre-heat or cool the environment to a desired setting, and turning-on or turning-off the lights 1908.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 20:
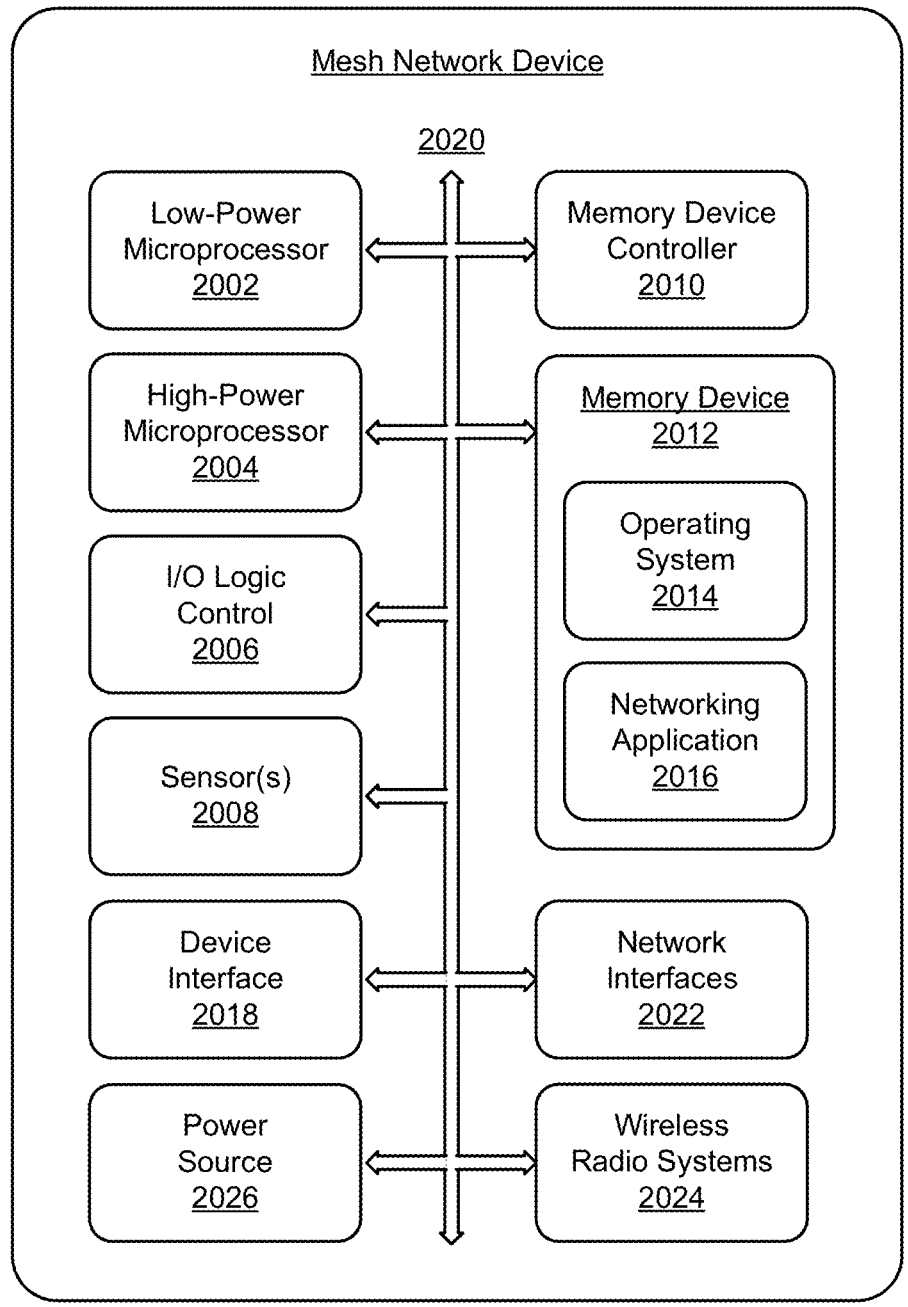
FIG. 20 illustrates an example mesh network device that can be implemented in a mesh network environment in accordance with one or more embodiments of the techniques described herein.

FIG. 20 illustrates an example mesh network device 2000 that can be implemented as any of the mesh network devices in a mesh network in accordance with one or more embodiments of efficient network stack for wireless application protocols as described herein. The device 2000 can be integrated with electronic circuitry, microprocessors, memory, input output (I/O) logic control, communication interfaces and components, as well as other hardware, firmware, and/or software to implement the device in a mesh network. Further, the mesh network device 2000 can be implemented with various components, such as with any number and combination of different components as further described with reference to the example device shown in FIG. 21.

In this example, the mesh network device 2000 includes a low-power microprocessor 2002 and a high-power microprocessor 2004 (e.g., microcontrollers or digital signal processors) that process executable instructions. The device also includes an input-output (I/O) logic control 2006 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 2002 and the high-power microprocessor 2004 can also support one or more different device functionalities of the device. For example, the high-power microprocessor 2004 may execute computationally intensive operations, whereas the low-power microprocessor 2002 may manage less complex processes such as detecting a hazard or temperature from one or more sensors 2008. The low-power processor 2002 may also wake or initialize the high-power processor 2004 for computationally intensive processes.

The one or more sensors 2008 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 2008 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 2000 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 2000 includes a memory device controller 2010 and a memory device 2012, such as any type of a nonvolatile memory and/or other suitable electronic data storage device. The mesh network device 2000 can also include various firmware and/or software, such as an operating system 2014 that is maintained as computer executable instructions by the memory and executed by a microprocessor. The device software may also include a networking application 2016 that implements embodiments of efficient network stack for wireless application protocols. The mesh network device 2000 also includes a device interface 2018 to interface with another device or peripheral component, and includes an integrated data bus 2020 that couples the various components of the mesh network device for data communication between the components. The data bus in the mesh network device may also be implemented as any one or a combination of different bus structures and/or bus architectures.

The device interface 2018 may receive input from a user and/or provide information to the user (e.g., as a user interface), and a received input can be used to determine a setting. The device interface 2018 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 2018 may also receive inputs from any number of peripherals, such as buttons, a keypad, a switch, a microphone, and an imager (e.g., a camera device).

The mesh network device 2000 can include network interfaces 2022, such as a mesh network interface for communication with other mesh network devices in a mesh network, and an external network interface for network communication, such as via the Internet. The mesh network device 2000 also includes wireless radio systems 2024 for wireless communication with other mesh network devices via the mesh network interface and for multiple, different wireless communications systems. The wireless radio systems 2024 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 2000 also includes a power source 2026, such as a battery and/or to connect the device to line voltage. An AC power source may also be used to charge the battery of the device.

Figure 21:
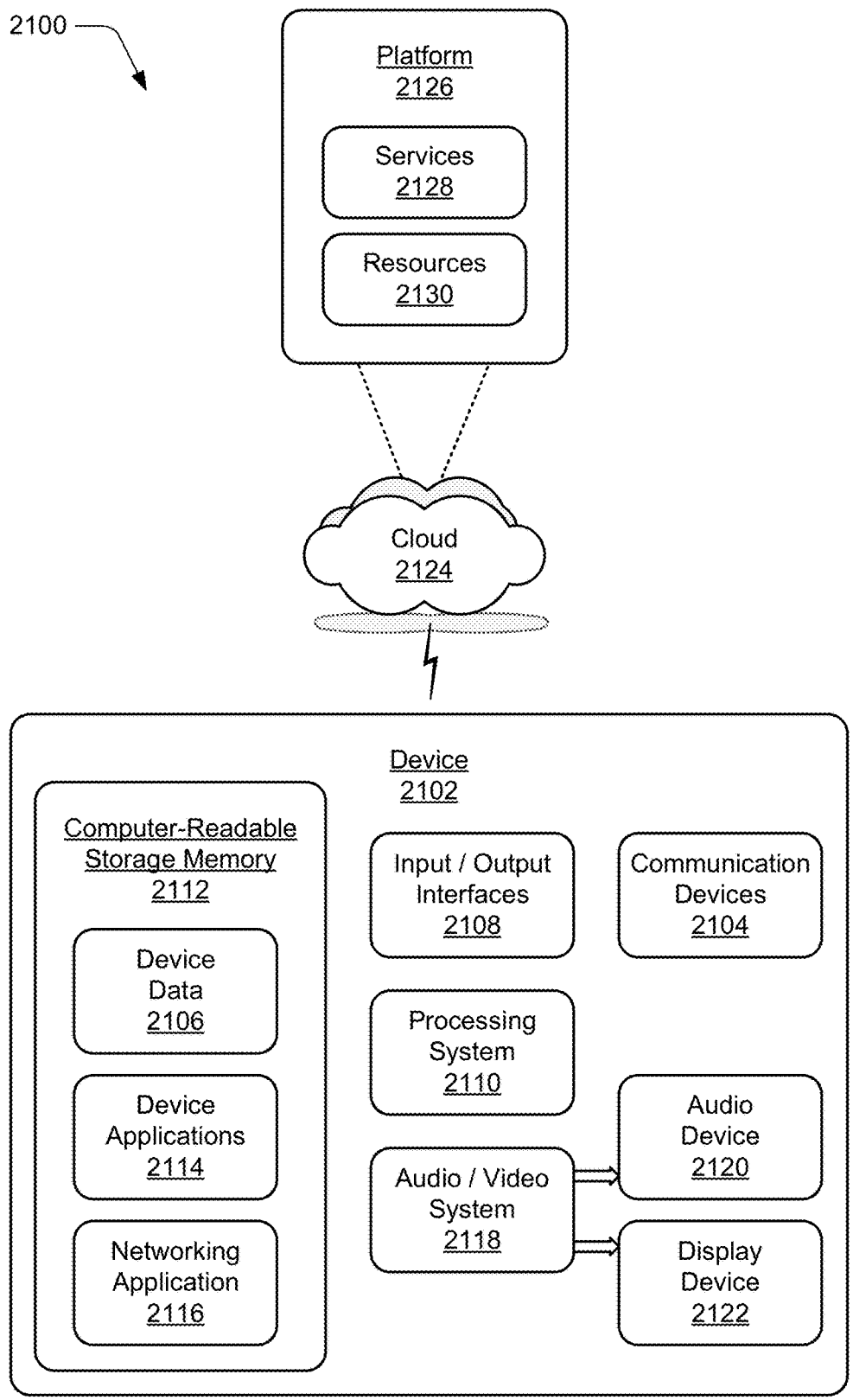
FIG. 21 illustrates an example system with an example device that can implement embodiments of efficient network stack for wireless application protocols.

FIG. 21 illustrates an example system 2100 that includes an example device 2102, which can be implemented as any of the mesh network devices that implement embodiments of efficient network stack for wireless application protocols as described with reference to the previous FIGS. 1-20. The example device 2102 may be any type of computing device, client device, mobile phone, tablet, communication, entertainment, gaming, media playback, and/or other type of device. Further, the example device 2102 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 2102 includes communication devices 2104 that enable wired and/or wireless communication of device data 2106, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 2104 can also include transceivers for cellular phone communication and/or for network data communication.

The device 2102 also includes input/output (I/O) interfaces 2108, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 2102 includes a processing system 2110 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 2102 may further include any type of a system bus or other data and command transfer system that couples the various components within the device. A system bus can include any one or combination of different bus structures and architectures, as well as control and data lines.

The device 2102 also includes computer-readable storage memory 2112, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 2112 provides storage of the device data 2106 and various device applications 2114, such as an operating system that is maintained as a software application with the computer-readable storage memory and executed by the processing system 2110. The device applications may also include a device manager, such as any form of a control application, software application, signal processing and control module, code that is native to a particular device, a hardware abstraction layer for a particular device, and so on. In this example, the device applications also include a networking application 2116 that implements embodiments of efficient network stack for wireless application protocols, such as when the example device 2102 is implemented as any of the mesh network devices described herein.

The device 2102 also includes an audio and/or video system 2118 that generates audio data for an audio device 2120 and/or generates display data for a display device 2122. The audio device and/or the display device include any devices that process, display, and/or otherwise render audio, video, display, and/or image data, such as the image content of a digital photo. In implementations, the audio device and/or the display device are integrated components of the example device 2102. Alternatively, the audio device and/or the display device are external, peripheral components to the example device. In embodiments, at least part of the techniques described for efficient network stack for wireless application protocols may be implemented in a distributed system, such as over a "cloud" 2124 in a platform 2126. The cloud 2124 includes and/or is representative of the platform 2126 for services 2128 and/or resources 2130.

The platform 2126 abstracts underlying functionality of hardware, such as server devices (e.g., included in the services 2128) and/or software resources (e.g., included as the resources 2130), and connects the example device 2102 with other devices, servers, etc. The resources 2130 may also include applications and/or data that can be utilized while computer processing is executed on servers that are remote from the example device 2102. Additionally, the services 2128 and/or the resources 2130 may facilitate subscriber network services, such as over the Internet, a cellular network, or Wi-Fi network. The platform 2126 may also serve to abstract and scale resources to service a demand for the resources 2130 that are implemented via the platform, such as in an interconnected device embodiment with functionality distributed throughout the system 2100. For example, the functionality may be implemented in part at the example device 2102 as well as via the platform 2126 that abstracts the functionality of the cloud 2124.

Although embodiments of efficient network stack for wireless application protocols have been described in language specific to features and/or methods, the subject of the appended claims is not necessarily limited to the specific features or methods described. Rather, the specific features and methods are disclosed as example implementations of efficient network stack for wireless application protocols, and other equivalent features and methods are intended to be within the scope of the appended claims. Further, various different embodiments are described and it is to be appreciated that each described embodiment can be implemented independently or in connection with one or more other described embodiments.

A method of communicating an application-layer message by a source node over a mesh network comprises receiving the application-layer message that includes a source address and a destination address; mapping the source address to an Internet Protocol Version 6 (IPv6) source address; mapping the destination address to an IPv6 destination address; transmitting the application-layer message by the source node to a destination node in the mesh network using a network stack, the IPv6 source address, and the IPv6 destination address, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message with a wireless transceiver in the mesh network.

Alternatively or in addition to the above described method, any one or combination of: the network stack further comprises a Datagram Transport Layer Security (DTLS) layer; the network stack further comprises a Constrained Application Protocol (CoAP) layer; serializing the application-layer message; in response to said transmitting the application-layer message, receiving an application-layer response message from the destination node using the network stack, and communicating the received application-layer response message to an application of the source node; wherein the application is one of: a ZigBee application, a Z-Wave application, an Open Interconnect Consortium (OIC) application, an AllJoyn application, or a fabric network application; and wherein the physical layer is an IEEE 802.15.4 Physical (PHY) layer and the MAC layer is an IEEE 802.15.4 MAC layer.

A mesh network device comprises a mesh network interface configured for communication in a mesh network; a memory and processor system to implement a network stack configured to: receive an application-layer message that includes a source address and a destination address; map the source address to an Internet Protocol Version 6 (IPv6) source address; map the destination address to an IPv6 destination address; transmit the application-layer message to a destination mesh network device using the network stack, the mapped source address, and the mapped destination address, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message over the mesh network.

Alternatively or in addition to the above described mesh network device, any one or combination of: the network stack further comprises a Datagram Transport Layer Security (DTLS) layer; the network stack further comprises a Constrained Application Protocol (CoAP) layer; the network stack is configured to: serialize the application layer message; the network stack is configured to: in response to the transmission of the application-layer message, receive an application-layer response message from the destination mesh network device, and communicate the received application-layer response message to an application of the mesh network device; wherein the application is one of: a ZigBee application, a Z-Wave application, an Open Interconnect Consortium (OIC) application, an AllJoyn application, or a fabric network application; and wherein the physical layer is an IEEE 802.15.4 Physical (PHY) layer and the MAC layer is an IEEE 802.15.4 MAC layer.

A mesh network system comprises a destination node configured to receive a packet over a mesh network; and a source node of the mesh network configured to: receive an application-layer message that includes a source address and a destination address; map the source address in the application-layer message to an Internet Protocol Version 6 (IPv6) source address; map the destination address in the application-layer message to an IPv6 destination address; transmit the application-layer message to the destination node using a network stack, the IPv6 source address, and the IPv6 destination address, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message over the mesh network to the destination node.

Alternatively or in addition to the above described mesh network system, any one or combination of: the network stack further comprises a Datagram Transport Layer Security (DTLS) layer; the network stack further comprises a Constrained Application Protocol (CoAP) layer; the source node is configured to: in response to the transmission of the application-layer message, receive an application-layer response message from the destination node at the physical layer of the network stack, and communicate the received application-layer response message to an application of the source node; wherein the application is one of: a ZigBee application, a Z-Wave application, an Open Interconnect Consortium (OIC) application, an AllJoyn application, or a fabric network application; and wherein the physical layer is an IEEE 802.15.4 Physical (PHY) layer and the MAC layer is an IEEE 802.15.4 MAC layer.

A method of communicating an application-layer message of a first network protocol over a mesh network using a second network protocol comprises receiving the application-layer message from a source node by a dual-stack router using a first network stack that implements the first network protocol; mapping a source address in the application-layer message to an Internet Protocol Version 6 (IPv6) source address; mapping a destination address in the application-layer message to an IPv6 destination address; transmitting the application-layer message to a destination node using the IPv6 source address and the IPv6 destination address, and using a second network stack that implements the second network protocol, the second network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message via the mesh network.

Alternatively or in addition to the above described method, any one or combination of: the second network stack further comprises a Datagram Transport Layer Security (DTLS) layer; the second network stack further comprises a Constrained Application Protocol (CoAP) layer; in response to said transmitting the application-layer message, receiving an application-layer response message from the destination node using the second network stack, and forwarding the received application-layer response message to the source node using the first network stack; wherein the application is one of: a ZigBee application, a Z-Wave application, an Open Interconnect Consortium (OIC) application, an AllJoyn application, or a fabric network application; and wherein the physical layer is an IEEE 802.15.4 Physical (PHY) layer and the MAC layer is an IEEE 802.15.4 MAC layer.

A mesh network device implemented as a dual-stack router comprises a mesh network interface configured for communication in a mesh network; a memory and processor system to implement an application-layer translation application that is configured to: receive an application-layer message from a source node using a first network stack that implements a first network protocol; map a source address in the application-layer message to an Internet Protocol Version 6 (IPv6) source address; map a destination address in the application-layer message to an IPv6 destination address; transmit the application-layer message to a destination node using the IPv6 source address and the IPv6 destination address, and using a second network stack that implements a second network protocol, the second network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message via the mesh network.

Alternatively or in addition to the above described mesh network device, any one or combination of: the second network stack further comprises a Datagram Transport Layer Security (DTLS) layer; the second network stack further comprises a Constrained Application Protocol (CoAP) layer; the application-layer translation application is configured to: in response to the transmission of the application-layer message, receive an application-layer response message from the destination node; and forward the received application-layer response message to the source node using the first network stack; wherein the first network stack comprises one or more layers of: a ZigBee network stack, a Z-Wave network stack, an Open Interconnect Consortium (OIC) network stack, or an AllJoyn network stack; wherein the first network stack comprises one or more layers of a Z-Wave network stack, and the mesh network device comprises a Z-Wave network interface configured for communication in a Z-Wave network; and wherein the physical layer is an IEEE 802.15.4 Physical (PHY) layer and the MAC layer is an IEEE 802.15.4 MAC layer.

A mesh network system comprises a source node configured to communicate using a first wireless application protocol; and a dual-stack router configured to: receive an application-layer message using a first network stack that implements the first wireless application protocol; map a source address in the application-layer message to an Internet Protocol Version 6 (IPv6) source address; map a destination address in the application-layer message to an IPv6 destination address; transmit the application-layer message to a destination node using the IPv6 source address and the IPv6 destination address, and using a second network stack that implements a second wireless application protocol, the second network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message via the mesh network.

Alternatively or in addition to the above described mesh network system, any one or combination of: the second network stack further comprises a Datagram Transport Layer Security (DTLS) layer; the second network stack further comprises a Constrained Application Protocol (CoAP) layer; the dual-stack router is configured to: in response to the transmission of the application-layer message, receive an application-layer response message from the destination node using the second network stack; and forward the received application-layer response message to the source node using the first network stack; wherein the first wireless application protocol is one of: a ZigBee wireless application protocol, a Z-Wave wireless application protocol, an Open Interconnect Consortium (OIC) wireless application protocol, or an AllJoyn wireless application protocol; wherein the first network stack comprises one or more layers of a Z-Wave network stack, and the dual-stack router comprises a Z-Wave network interface configured for communication in a Z-Wave network; and wherein the physical layer is an IEEE 802.15.4 Physical (PHY) layer and the MAC layer is an IEEE 802.15.4 MAC layer.

A method of discovering a service across multiple mesh networks comprises establishing communication between a computing device and the multiple mesh networks over a communication network; transmitting a discovery message for the service from the computing device to the multiple mesh networks, said transmitting effective to propagate the discovery message to nodes in the multiple mesh networks; and receiving a response message from each node in the multiple mesh networks that supports the service, the response message comprising an indication of the supported service and an address of the node.

Alternatively or in addition to the above described method, any one or combination of: inserting a binding of the supported service and the address of each node that supports the service in a database; wherein the multiple mesh networks are logically different mesh networks; wherein the multiple mesh networks are located in geographically different locations; wherein the mesh networks comprise nodes that include a ZigBee application layer and an efficient network stack; and wherein the communication network is the Internet.

A computing device comprises a network interface configured for communication over a communication network to multiple mesh networks; a memory and processor system to implement a discovery application that is configured to: establish communication between the computing device and the multiple mesh networks over the communication network; transmit a discovery message for a service to the multiple mesh networks, the transmission effective to propagate the discovery message to nodes in the multiple mesh networks; and receive a response message from each node in the multiple mesh networks that supports the service, the response message comprising an indication of the supported service and an address of the node.

Alternatively or in addition to the above described mesh network device, any one or combination of: wherein the discovery application is configured to: insert a binding of the supported service and the address of each node that supports the service in a database; wherein the multiple mesh networks are logically different mesh networks; wherein the multiple mesh networks are located in geographically different locations; wherein the mesh networks comprise nodes that include a ZigBee application layer and an efficient network stack; and wherein the communication network is the Internet.

A mesh network system comprises multiple mesh networks, each comprising multiple nodes; a communication network that communicatively links the multiple mesh networks to a computing device; and the computing device configured to: establish communication with the multiple mesh networks over the communication network; transmit a discovery message for a service to the multiple mesh networks via the communication network, the transmission effective to propagate the discovery message to the nodes in the multiple mesh networks; and receive a response message from each node in the multiple mesh networks that supports the service, the response message comprising an indication of the supported service and an address of the node.

Alternatively or in addition to the above described mesh network system, any one or combination of: wherein the computing device configured to: insert a binding of the supported service and the address of each node that supports the service in a database; wherein the multiple mesh networks are logically different mesh networks; wherein the multiple mesh networks are located in geographically different locations; wherein the mesh networks comprise nodes that include a ZigBee application layer and an efficient network stack; and wherein the communication network is the Internet.

A method of translating an application-layer message from a first wireless application protocol to a second wireless application protocol comprises receiving an application-layer message at a gateway via a mesh network interface, the application-layer message comprising a source address and a destination address; forwarding the received application-layer message over an external network to a translation service that performs: mapping the source address to an Internet Protocol Version 6 (IPv6) source address; mapping the destination address to an IPv6 destination address; receiving a translated application-layer message from the translation service, the translated application-layer message including the IPv6 source address and the IPv6 destination address; transmitting the translated application-layer message over the mesh network interface using a network stack, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message over the mesh network interface.

Alternatively or in addition to the above described method, any one or combination of: the application-layer message further includes a profile identifier that identifies an application profile of the first wireless application protocol, the method comprising: forwarding the application-layer message over the external network to the translation service that is associated with the profile identifier; receiving a mapping of the profile identifier to the translation service; storing the received mapping in a database of mappings of profile identifiers to translation services; and in response to said receiving the application-layer message, comparing the profile identifier to one or more mappings in the database to determine the translation service associated with the profile identifier; wherein the application profile is one of: a lighting control profile, a home automation profile, a commercial building automation profile, a smart energy profile, or a security profile.

A mesh network device implemented an application gateway device comprises a mesh network interface configured for communication in a mesh network; a network interface configured for communication with an external network; and a memory and processor system to implement a gateway application that is configured to: receive an application-layer message via the mesh network interface, the application-layer message comprising a source address and a destination address; forward the application-layer message over the external network to a translation service implemented to: map the source address to an Internet Protocol Version 6 (IPv6) source address; map the destination address to an IPv6 destination address; receive a translated application-layer message from the translation service, the translated application-layer message including the IPv6 source address and the IPv6 destination address; transmit the translated application-layer message over the mesh network interface using a network stack, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message over the mesh network interface.

Alternatively or in addition to the above described mesh network device, any one or combination of: the application-layer message further includes a profile identifier that identifies an application profile of the first wireless application protocol, and the gateway application configured to: forward the application-layer message over the external network to the translation service that is associated with the profile identifier; the gateway application is further configured to: receive a mapping of the profile identifier to the translation service; store the received mapping in a database of mappings of profile identifiers to translation services; and in response to the reception of the application-layer message, compare the profile identifier to one or more mappings in the database to determine the translation service associated with the profile identifier; wherein the application profile is one of: a lighting control profile, a home automation profile, a commercial building automation profile, a smart energy profile, or a security profile.

A mesh network system comprises a translation service configured to translate application-layer messages of a first wireless application protocol to a second wireless application protocol, the translation service configured to: map a source address in an application-layer message to an Internet Protocol Version 6 (IPv6) source address; map a destination address in an application-layer message to an IPv6 destination address; and a gateway configured to: receive the application-layer message in the first wireless application protocol via a mesh network interface, the application-layer message comprising the source address and the destination address; forward the received application-layer message over an external network to the translation service; receive a translated application-layer message from the translation service, the translated application-layer message including the IPv6 source address and the IPv6 destination address; transmit the translated application-layer message over the mesh network interface using a network stack, the network stack comprising: a transport layer configured to transport the application-layer message using User Datagram Protocol (UDP); a network layer configured to communicate the application-layer message using IPv6; a data link layer configured to encode the application-layer message for transmission, the data link layer comprising a 6LoWPAN adaptation layer and a Media Access Control (MAC) layer; and a physical layer configured to transmit the encoded application-layer message over the mesh network interface.

Alternatively or in addition to the above described mesh network system, any one or combination of: the application-layer message further includes a profile identifier that identifies an application profile of the first wireless application protocol; and the gateway further configured to forward the application-layer message over the external network to the translation service that is associated with the profile identifier; the gateway application further configured to: receive a mapping of the profile identifier to the translation service; store the received mapping in a database of mappings of profile identifiers to translation services; and in response to the reception of the application-layer message, compare the profile identifier to one or more mappings in the database to determine the translation service associated with the profile identifier; and wherein the application profile is one of: a lighting control profile, a home automation profile, a commercial building automation profile, a smart energy profile, or a security profile.

The invention claimed is:

1. A method of translating an application-layer message from a first wireless application protocol to a second wireless application protocol, the method comprising:

receiving an application-layer message at a gateway via a mesh network interface, the application-layer message comprising a source address, a destination address, and a profile identifier that identifies an application profile of the first wireless application protocol;

forwarding the received application-layer message over an external network to a translation service associated with the profile identifier that performs:
  mapping the source address to an Internet Protocol Version 6 (IPv6) source address;
  mapping the destination address to an IPv6 destination address;
receiving a translated application-layer message from the translation service, the translated application-layer message including the IPv6 source address and the IPv6 destination address;
transmitting the translated application-layer message over the mesh network interface using a network stack, the network stack comprising:
  a transport layer configured to transport the application-layer message using User Datagram Protocol (UDP);
  a network layer configured to communicate the application-layer message using IPv6;
  a data link layer configured to encode the application-layer message for transmission, the data link layer comprising a 6LoWPAN adaptation layer and a Media Access Control (MAC) layer; and
  a physical layer configured to transmit the encoded application-layer message over the mesh network interface.

2. The method of claim 1, further comprising:
receiving a mapping of the profile identifier to the translation service;
storing the received mapping in a database of mappings of profile identifiers to translation services; and
in response to said receiving the application-layer message, comparing the profile identifier to one or more mappings in the database to determine the translation service associated with the profile identifier.

3. The method of claim 1, wherein the application profile is one of:
a lighting control profile;
a home automation profile;
a commercial building automation profile;
a smart energy profile; or
a security profile.

4. The method of claim 1, wherein the gateway is a border router.

5. A mesh network device implemented as an application gateway device, the mesh network device comprising:
a mesh network interface configured for communication in a mesh network;
a network interface configured for communication with an external network; and
a memory and processor system to implement a gateway application that is configured to:
  receive an application-layer message via the mesh network interface, the application-layer message comprising a source address, a destination address, and a profile identifier that identifies an application profile of a first wireless application protocol;
  forward the application-layer message over the external network to a translation service associated with the profile identifier and implemented to:
    map the source address to an Internet Protocol Version 6 (IPv6) source address;
    map the destination address to an IPv6 destination address;
  receive a translated application-layer message from the translation service, the translated application-layer message including the IPv6 source address and the IPv6 destination address;
  transmit the translated application-layer message over the mesh network interface using a network stack, the network stack comprising:
    a transport layer configured to transport the application-layer message using User Datagram Protocol (UDP);
    a network layer configured to communicate the application-layer message using IPv6;
    a data link layer configured to encode the application-layer message for transmission, the data link layer comprising a 6LoWPAN adaptation layer and a Media Access Control (MAC) layer; and
    a physical layer configured to transmit the encoded application-layer message over the mesh network interface.

6. The mesh network device of claim 5, wherein the gateway application is further configured to:
receive a mapping of the profile identifier to the translation service;
store the received mapping in a database of mappings of profile identifiers to translation services; and
in response to the reception of the application-layer message, compare the profile identifier to one or more mappings in the database to determine the translation service associated with the profile identifier.

7. The mesh network device of claim 5, wherein the application profile is one of:
a lighting control profile;
a home automation profile;
a commercial building automation profile;
a smart energy profile; or
a security profile.

8. The mesh network device of claim 5, wherein the application gateway device is a border router.

9. A mesh network system, comprising:
a translation service configured to translate application-layer messages associated with a profile identifier that identifies an application profile of a first wireless application protocol to a second wireless application protocol, the translation service configured to:
  map a source address in an application-layer message to an Internet Protocol Version 6 (IPv6) source address;
  map a destination address in an application-layer message to an IPv6 destination address; and
a gateway comprising:
  a mesh network interface configured for communication in a mesh network;
  a network interface configured for communication with an external network; and
  a memory and processor system to implement a gateway application that is configured to:
    receive the application-layer message in the first wireless application protocol via a mesh network interface, the application-layer message comprising the source address, the destination address, and the profile identifier;
    forward the received application-layer message over an external network to the translation service;
    receive a translated application-layer message from the translation service, the translated application-layer message including the IPv6 source address and the IPv6 destination address;
    transmit the translated application-layer message over the mesh network interface using a network stack, the network stack comprising:

a transport layer configured to transport the application-layer message using User Datagram Protocol (UDP);

a network layer configured to communicate the application-layer message using IPv6;

a data link layer configured to encode the application-layer message for transmission, the data link layer comprising a 6LoWPAN adaptation layer and a Media Access Control (MAC) layer; and a physical layer configured to transmit the encoded application-layer message over the mesh network interface.

10. The mesh network system of claim 9, the gateway further configured to:

receive a mapping of the profile identifier to the translation service;

store the received mapping in a database of mappings of profile identifiers to translation services; and in response to the reception of the application-layer message, compare the profile identifier to one or more mappings in the database to determine the translation service associated with the profile identifier.

11. The mesh network system of claim 9, wherein the application profile is one of:

a lighting control profile;

a home automation profile;

a commercial building automation profile;

a smart energy profile; or a security profile.

12. The system of claim 9, wherein the gateway is a border router.

\* \* \* \* \*